(12) United States Patent
Kitagawa et al.

(10) Patent No.: US 12,212,258 B2
(45) Date of Patent: Jan. 28, 2025

(54) CONTROLLER FOR ROTARY ELECTRIC MACHINE AND ELECTRIC POWER STEERING APPARATUS

(71) Applicant: Mitsubishi Electric Corporation, Tokyo (JP)

(72) Inventors: Jun Kitagawa, Tokyo (JP); Tatsuya Mori, Tokyo (JP); Masahiko Orii, Tokyo (JP); Kenta Kubo, Tokyo (JP); Kenta Sawada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 18/030,596

(22) PCT Filed: Nov. 30, 2020

(86) PCT No.: PCT/JP2020/044420
§ 371 (c)(1),
(2) Date: Apr. 6, 2023

(87) PCT Pub. No.: WO2022/113318
PCT Pub. Date: Jun. 2, 2022

(65) Prior Publication Data
US 2023/0412100 A1  Dec. 21, 2023

(51) Int. Cl.
*H02P 25/03* (2016.01)
*B62D 5/04* (2006.01)
*H02P 21/22* (2016.01)

(52) U.S. Cl.
CPC ............... *H02P 21/22* (2016.02); *B62D 5/04* (2013.01)

(58) Field of Classification Search
CPC ...... H02P 25/03; H02P 21/0089; H02P 21/22; B62D 5/046; B62D 5/04

USPC ..................................................... 318/400.02
See application file for complete search history.

(56) References Cited

U.S. PATENT DOCUMENTS

| 6,427,104 | B1 | 7/2002 | Matsushita et al. |
| 9,438,156 | B2* | 9/2016 | Kato ............... H02P 21/22 |
| 2001/0005121 | A1* | 6/2001 | Sakamaki ............. B62D 5/0481 318/727 |

(Continued)

FOREIGN PATENT DOCUMENTS

JP  3559258 B2  8/2004

OTHER PUBLICATIONS

International Search Report for PCT/JP2020/044420 dated Jan. 26, 2021.

*Primary Examiner* — Gabriel Agared
(74) *Attorney, Agent, or Firm* — Sughrue Mion, PLLC

(57) ABSTRACT

To provide a controller for rotary electric machine and an electric power steering apparatus which can increases decreases an increase amount of the current of d-axis in the negative direction appropriately, and can perform the weakening magnetic flux appropriately, irrespective of increase and decrease in the rotational angle speed, without using the information on the inductance and the interlinkage flux of the rotor. A controller for rotary electric machine, in a case where the current command value of q-axis is a positive value, changes the current command value of d-axis, based on a deviation between an offset q-axis current command value obtained by subtracting the q-axis offset value of the positive value from the current command value of q-axis, and the current detection value of q-axis.

17 Claims, 16 Drawing Sheets

(56) References Cited

U.S. PATENT DOCUMENTS

| | | | |
|---|---|---|---|
| 2009/0015182 A1* | 1/2009 | Kariatsumari | H02P 21/22 |
| | | | 318/400.02 |
| 2010/0156330 A1* | 6/2010 | Inoue | H02P 25/024 |
| | | | 318/400.02 |
| 2013/0278200 A1* | 10/2013 | Fujii | H02P 6/10 |
| | | | 318/722 |
| 2014/0246997 A1* | 9/2014 | Suzuki | H02P 6/16 |
| | | | 318/400.04 |
| 2014/0285125 A1* | 9/2014 | Kato | H02P 21/141 |
| | | | 318/721 |
| 2015/0207446 A1* | 7/2015 | Kakihara | H02P 6/183 |
| | | | 318/400.33 |
| 2017/0315514 A1* | 11/2017 | Kitamoto | H02P 21/22 |
| 2019/0260327 A1* | 8/2019 | Furukawa | H02P 29/024 |

\* cited by examiner

FIG. 7
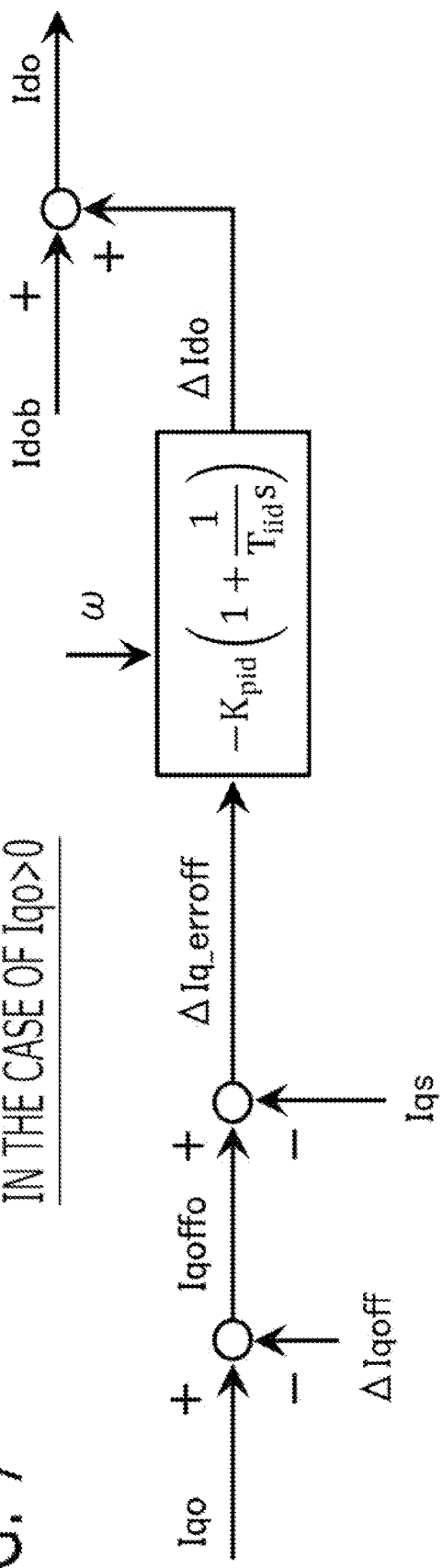
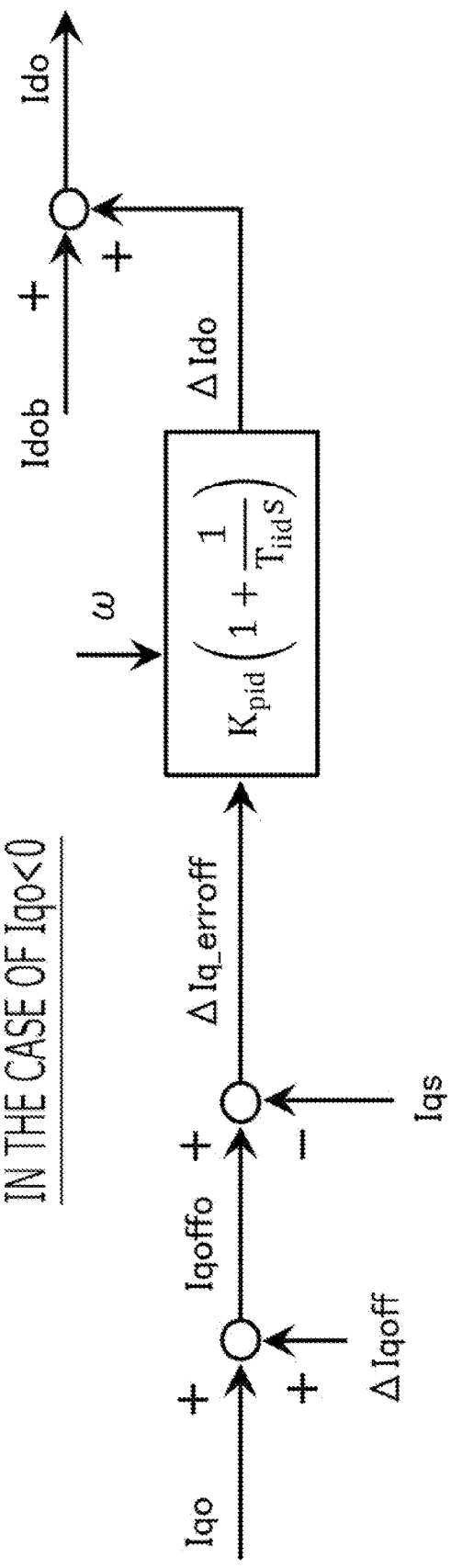

FIG. 19
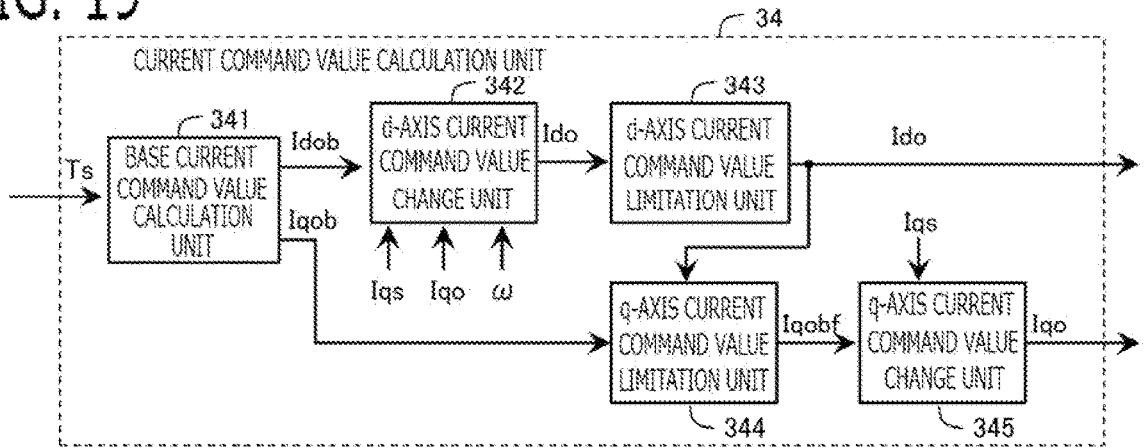
FIG. 20 q-AXIS CURRENT COMMAND VALUE CHANGE UNIT
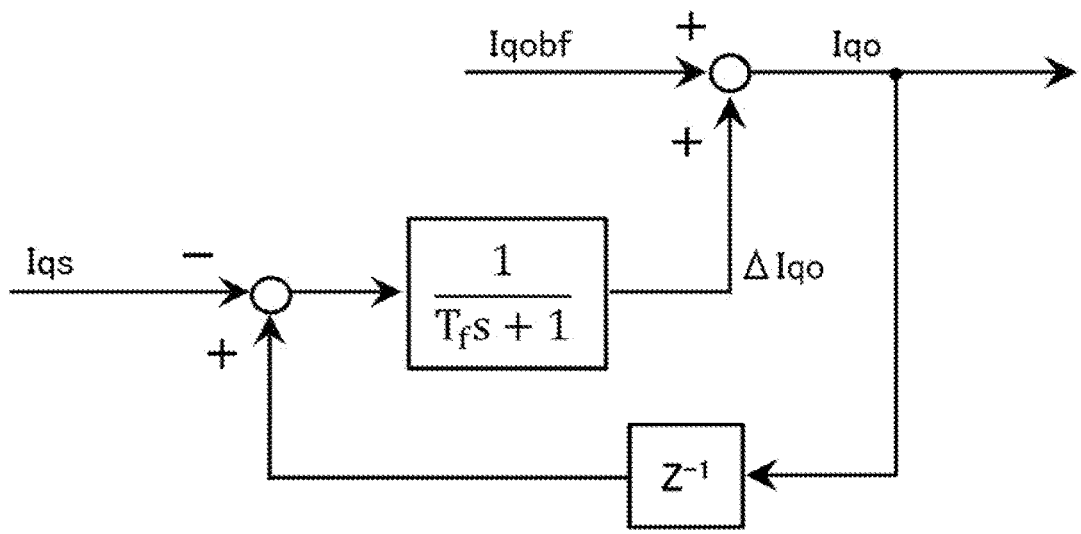

CONTROLLER FOR ROTARY ELECTRIC MACHINE AND ELECTRIC POWER STEERING APPARATUS

CROSS REFERENCE TO RELATED APPLICATIONS

This application is a National Stage of International Application No. PCT/JP2020/044420 filed Nov. 30, 2020.

TECHNICAL FIELD

The present disclosure is related with a controller for rotary electric machine and an electric power steering apparatus.

BACKGROUND ART

In the permanent magnet type synchronous rotary electric machine, the induced voltage proportional to the rotational angle speed of the rotor is generated by the interlinkage flux of the permanent magnet. At high speed rotation, when the difference between the maximum applied voltage and the induced voltage decreases, a desired current of q-axis cannot be energized to the windings, and the output torque drops. Then, generally, at high speed rotation, the magnetic flux weakening control which increases the current of d-axis in the negative direction, generates the magnetic flux which weakens the interlinkage flux of the permanent magnet in the windings, and reduces the induced voltage is performed.

There are various kinds of methods for the magnetic flux weakening control. In patent document 1, by performing the proportional control or the integral control based on the deviation between the q-axis current command value and the q-axis current detection value, the current of d-axis is increased or decreased, and the magnetic flux weakening control is performed.

CITATION LIST

Patent Literature

Patent document 1: JP 3559258 B

SUMMARY OF INVENTION

Technical Problem

In the magnetic flux weakening control, in order to set the optimal current command values of d-axis and q-axis in feedforward, the accurate information on the inductance concerning generation of the induced voltage and the interlinkage flux of the rotor is necessary. However, if the accurate information of the inductances and the interlinkage flux of the rotor cannot be obtained, the optimal current command values of d-axis and q-axis cannot be set in feedforward. Alternatively, if the inductance and the interlinkage flux of the rotor are varied due to an aging change or a temperature characteristic, the setting accuracy of the current command values of d-axis and q-axis is deteriorated.

On the other hand, in the technology of patent document 1, the current command value of d-axis is increased or decreased by the proportional control or the integral control, based on the q-axis current deviation between the current command value of q-axis and the current detection value of q-axis. Accordingly, the current command values of d-axis and q-axis are calculated, without using the information on the inductance and the interlinkage flux of the rotor. However, when the induced voltage increases by the increase in the rotational angle speed, and the current of q-axis is limited by the voltage limit ellipse by the induced voltage and drops, the q-axis current deviation increases. Accordingly, the current of d-axis is increased in the negative direction, and a certain degree of good weakening magnetic flux is performed. On the other hand, when the induced voltage decreases by the decrease in the rotational angle speed, the current of q-axis is no longer limited by the voltage limit ellipse, and the q-axis current deviation is lost, the q-axis current deviation becomes 0. Accordingly, the increase amount of the current of d-axis in the negative direction cannot be decreased, and appropriate weakening magnetic flux is not performed. In this state, the current command value of d-axis may change in an unexpected direction by noise component of the current of q-axis and the like.

Then, the purpose of the present disclosure is to provide a controller for rotary electric machine and an electric power steering apparatus which can increases or decreases an increase amount of the current of d-axis in the negative direction appropriately, and can perform the weakening magnetic flux appropriately, irrespective of increase and decrease in the rotational angle speed, without using the information on the inductance and the interlinkage flux of the rotor.

Solution to Problem

A controller for rotary electric machine according to the present disclosure that controls a rotary electric machine which is provided with a stator having plural-phase windings and a rotor having a magnet via an electric power converter, the controller for rotary electric machine including:
  a current detection unit that detects currents which flows into the plural-phase windings;
  a current coordinate conversion unit that converts current detection values into a current detection value of d-axis and a current detection value of q-axis on a dq-axis rotating coordinate system consisting of a d-axis defined in a direction of a magnetic pole position of the rotor and a q-axis defined in a direction advanced to the d-axis by 90 degrees in an electrical angle, based on a rotational angle of the rotor;
  a current command value calculation unit that calculates a current command value of d-axis and a current command value of q-axis;
  a voltage command value calculation unit that changes a voltage command value of d-axis and a voltage command value of q-axis so that the current detection value of d-axis approaches the current command value of d-axis, and the current detection value of q-axis approaches the current command value of q-axis; and converts the voltage command value of d-axis and the voltage command value of q-axis into voltage command values of plural-phase, based on the rotational angle; and
  a switching control unit that turns on and off a plurality of switching devices provided in the electric power converter, based on the voltage command values of plural-phase,
  wherein, in a case where the current command value of q-axis is a positive value, the current command value calculation unit changes the current command value of d-axis, based on a deviation between an offset q-axis current command value obtained by subtracting a q-axis offset value which is a positive value, from the current command value of q-axis, and the current detection value of q-axis.

An electric power steering apparatus according to the present disclosure including:
the controller for rotary electric machine,
the electric power converter,
the rotary electric machine, and
a driving force transmission mechanism which transmits a driving force of the rotary electric machine to a vehicle steering apparatus.

Advantage of Invention

According to the controller for rotary electric machine and the electric power steering apparatus according to the present disclosure, when the current of q-axis is upper-limited by the voltage limit ellipse by the induced voltage, an increase amount of the current command value of d-axis in the negative direction is increased or decreased so as to move to an intersection point between the voltage limit ellipse and a straight line which is decreased by the q-axis offset value from the current command value of q-axis. At this time, since the current detection value of q-axis is below the current command value of q-axis by the q-axis offset value, the voltage command value of q-axis can be stuck to the upper limitation value. The voltage utilization factor of the voltage command value can be maintained at the maximum value. In the case where the q-axis offset value is larger than an amplitude of the noise component of the current detection value of q-axis, even if the noise component occurs, the voltage command value of q-axis can be stuck to the upper limitation value, and the strange noise and the unwanted sound of the rotary electric machine can be reduced. Accordingly, by changing the current command value of d-axis, based on the deviation between the offset q-axis current command value obtained by subtracting the q-axis offset value from the current command value of q-axis, and the current detection value of q-axis. Without using the information on the inductance and the interlinkage flux of the rotor, the voltage limit ellipse which changes according to the rotational angle speed is followed automatically, the current of d-axis and the current of q-axis are moved to an intersection point between the voltage limit ellipse and the straight line which is decreased by the q-axis offset value from the current command value of q-axis, and appropriate weakening magnetic flux can be performed.

BRIEF DESCRIPTION OF THE DRAWINGS

FIG. 7 is a block diagram of the d-axis current command value change unit according to Embodiment 1;
FIG. 19 is a block diagram of the current command value calculation unit according to Embodiment 4;
and
FIG. 20 is a block diagram of the q-axis current command value change unit according to Embodiment 4.

DETAILED DESCRIPTION OF THE EMBODIMENTS

1. Embodiment 1

Figure 1:
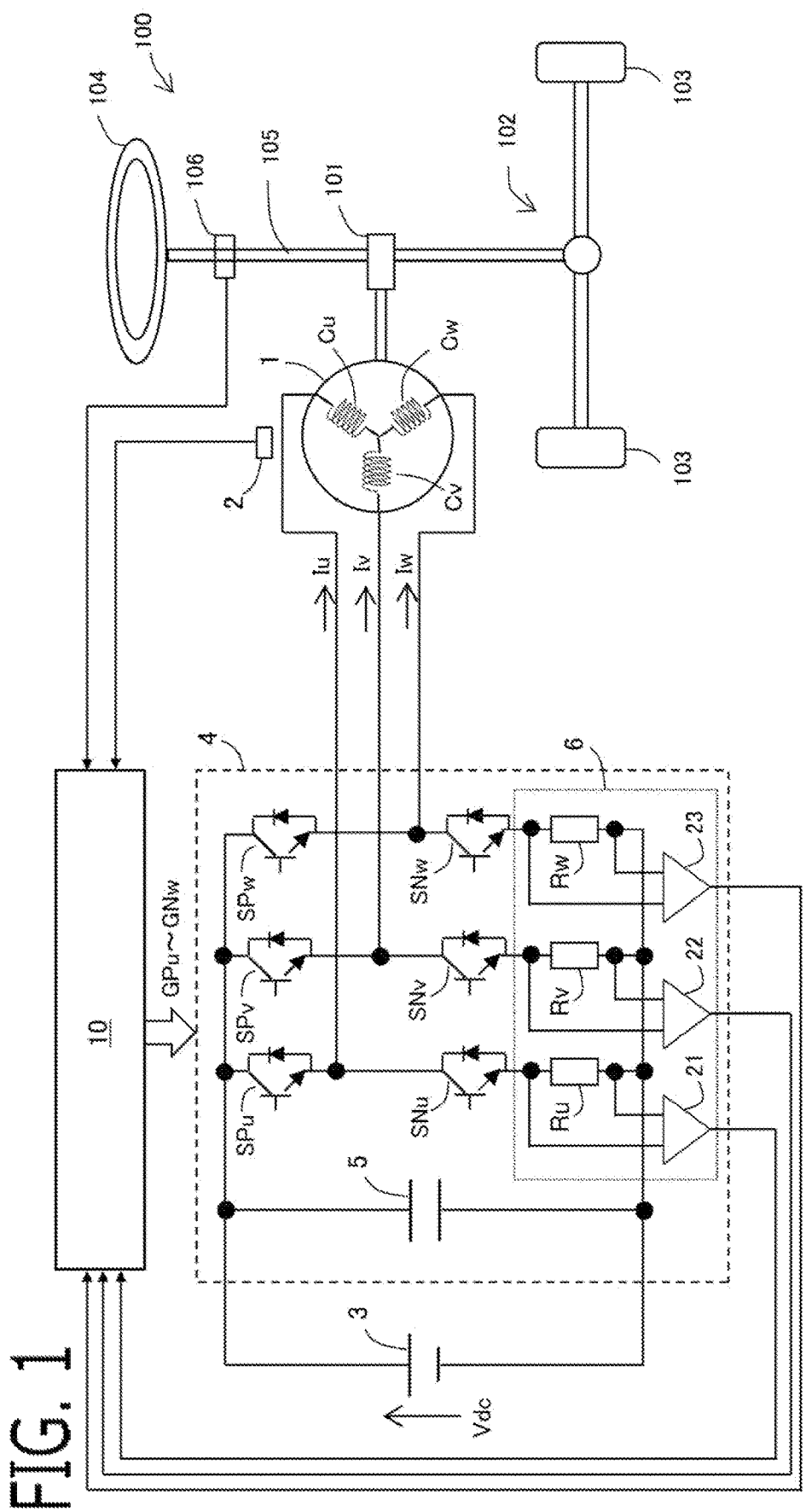
FIG. 1 is a schematic configuration diagram of the rotary electric machine, the electric power converter, and the controller according to Embodiment 1.

A controller 10 for rotary electric machine (hereinafter, referred to simply as the controller 10) according to Embodiment 1 will be explained with reference to drawings. FIG. 1 is a schematic configuration diagram of a rotary electric machine 1, an electric power converter 4, and the controller 10 according to the present embodiment. In the present embodiment, the rotary electric machine 1 is used as a driving force source of an electric power steering apparatus 100. The rotary electric machine 1, the electric power converter 4, and the controller 10 constitute the electric power steering apparatus 100.

1-1. Rotary Electric Machine 1

The rotary electric machine 1 is provided with a stator and a rotor disposed on the radial-direction inner side of the stator. The stator is provided with plural-phase windings (in this example, three-phase windings Cu, Cv, Cw of U phase, V phase, and W phase). The rotary electric machine 1 is a permanent magnet type synchronous rotary electric machine in which the permanent magnet is provided in the rotor. It is a surface magnet type in which the permanent magnet is provided on the peripheral face of the rotor. It may be an embedded magnet type in which the permanent magnet is provided inside the rotor. The three-phase windings may be connected by star connection, or may be connected by Δ connection.

The rotor is provided with a rotation sensor 2 for detecting a rotational angle of the rotor. Resolver, encoder, or MR sensor is used for the rotation sensor 2. An output signal of the rotation sensor 2 is inputted into the controller 10. As described later, the rotation sensor 2 may not be provided, but it may be a configuration of sensorless in which the angle is estimated based on current information.

1-2. Electric Power Converter 4

As the electric power converter, an inverter is used. As the electric power converter 4, an electric power converter other than the inverter, for example, a matrix converter, may be used.

The inverter 4 is provided with three sets of series circuits (leg) in each of which a positive electrode side switching device SP connected to a positive electrode side of the DC power source 3 and a negative electrode side switching device SN connected to a negative electrode side of the DC power source 3 are connected in series, corresponding to each phase of three phases. A connection node of two switching devices in the series circuit of each phase is connected to the winding of the corresponding phase.

Specifically, in the series circuit of U phase, the positive electrode side switching device SPu of U phase and the negative electrode side switching device SNu of U phase are connected in series, and the connection node of two switching devices is connected to the winding Cu of U phase. In the series circuit of V phase, the positive electrode side switching device SPv of V phase and the negative electrode side switching device SNv of V phase are connected in series, and the connection node of two switching devices is connected to the winding Cv of V phase. In the series circuit of W phase, the positive electrode side switching device SPw of W phase and the negative electrode side switching device SNw of W phase are connected in series, and the connection node of two switching devices is connected to the winding Cw of W phase. A smoothing capacitor 5 is connected between the positive electrode side and the negative electrode side of the DC power source 3.

IGBT (Insulated Gate Bipolar Transistor) in which a diode is connected in reversely parallel, MOSFET (Metal Oxide Semiconductor Field Effect Transistor), bipolar transistor in which a diode is connected in reversely parallel, or the like is used for the switching devices. A gate terminal of each switching device is connected to the controller 10 via a gate drive circuit and the like. The each switching device is turned on or turned off by the switching signals GPu to GNw outputted from the controller 10.

The DC power source 3 outputs a DC voltage Vdc to the inverter 4. In the present embodiment, the DC voltage Vdc is set to 12V. The DC power source 3 may be any apparatus which outputs the DC voltage Vdc, such as a battery, a DC-DC converter, a diode rectifier, and a PWM rectifier. A voltage sensor which detects the DC voltage Vdc may be provided in the DC power source 3, and an output signal of the voltage sensor may be inputted into the controller 10. The controller 10 may control using the detected DC voltage Vdc.

A current sensor 6 which detects current which flows into the winding of each phase is provided. The current sensors 6 is a current sensor, such as shunt resistance or Hall element. An output signal of the current sensor 6 is inputted into the controller 10.

In the present embodiment, the current sensor 6 is provided in the series circuit of two switching devices of each phase. A resistor Ru of U phase, a resistor Rv of V phase, and a resistor Rw of W phase are connected in series to the negative electrode side of the negative electrode side switching device SN of each phase. About the resistors Ru, Rv, Rw of three phases, a both ends potential difference of the resistor of each phase is detected by an amplifier 21, 22, 23, and the both ends potential difference is inputted into the controller 10.

The current sensor 6 may be provided on a wire which connects the series circuit of two switching devices of each phase, and the coil of each phase. Alternatively, a current sensor may be provided on the wire which connects the inverter 4 and the DC power source 3, and the current of the winding of each phase may be detected by well-known "bus line one-shunt system".

1-3. Electric Power Steering Apparatus 100

The electric power steering apparatus 100 is provided with the controller for the rotary electric machine 10, the inverter 4, the rotary electric machine 1, and a driving force transmission mechanism 101 that transmits the driving force of the rotary electric machine 1 to a steering apparatus 102 of a vehicle.

The rotation axis of the rotor of the rotary electric machine 1 is connected with the steering apparatus 102 of the wheels 103 via the driving force transmission mechanism 101. For example, the electric power steering apparatus 100 is provided with a handle 104 that a driver rotates right and left, a shaft 105 that is connected with the handle 104 and transmits a steering wheel torque by the handle 104 to the steering apparatus 102 of the wheels 103, a torque sensor 106 that is mounted on the shaft 105 and detects a steering torque Ts by the handle 104, and a driving force transmission mechanisms 101, such as a worm gear mechanism, which connects the rotation axis of the electric rotary machine 1 with the shaft 105. The output signal of the torque sensor 106 is inputted into the controller 10 (the input circuit 92).

1-4. Controller 10

Figure 2:
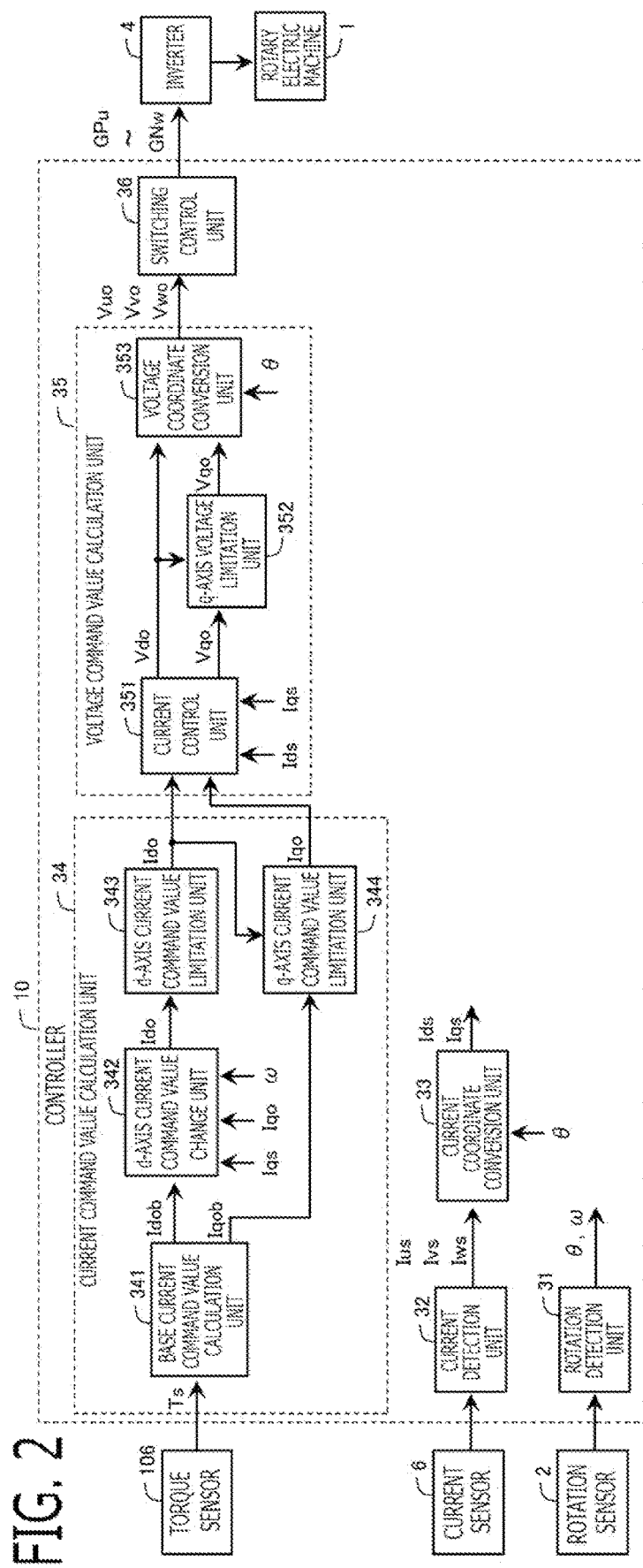
FIG. 2 is a schematic block diagram of the controller according to Embodiment 1.
Figure 3:
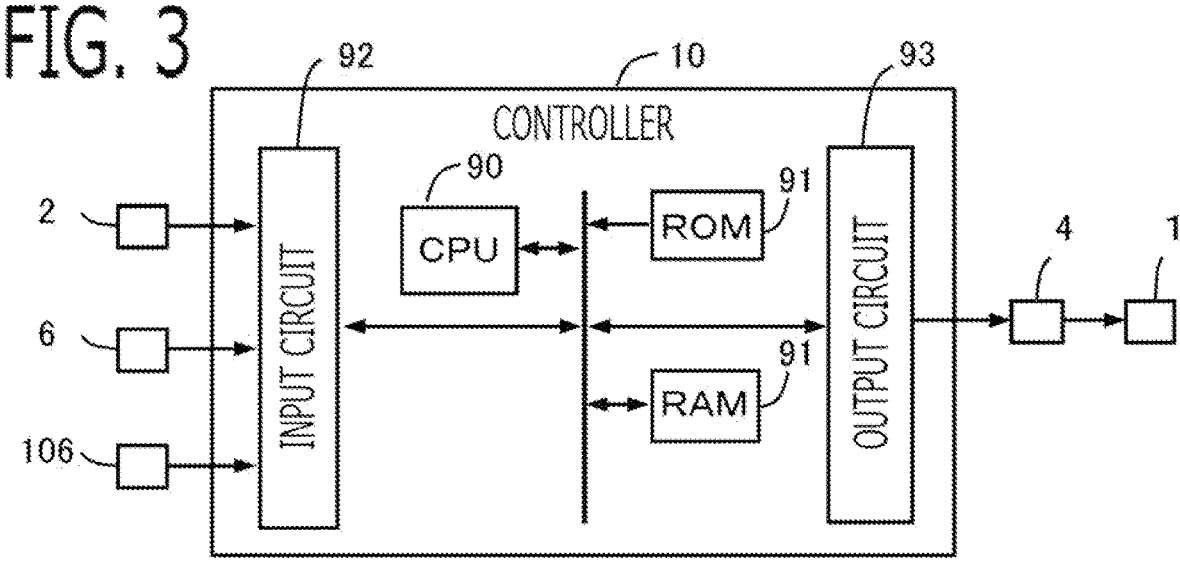
FIG. 3 is a hardware configuration diagram of the controller according to Embodiment 1.

The controller 10 controls the rotary electric machine 1 via the inverter 4. As shown in FIG. 2, the controller 10 is provided with a rotation detection unit 31, a current detection unit 32, a current coordinate conversion unit 33, a current command value calculation unit 34, a voltage command value calculation unit 35, a switching control unit 36, and the like. Each function of the controller 10 is realized by processing circuits provided in the controller 10. Specifically, as shown in FIG. 3, the controller 10 is provided with, as a processing circuit, an arithmetic processor (computer) 90 such as a CPU (Central Processing Unit), storage apparatuses 91 that exchange data with the arithmetic processor 90, an input circuit 92 that inputs external signals to the arithmetic processor 90, an output circuit 93 that outputs signals from the arithmetic processor 90 to the outside, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, a RAM (Random Access Memory) which can read data and write data from the arithmetic processor 90, a ROM (Read Only Memory) which can read data from the arithmetic processor 90, and the like are provided. The input circuit 92 is connected with various kinds of sensors and switches such as the rotation sensor 2, the current sensor 6, and the torque sensor 106, and is provided with A/D converter and the like for inputting output signals from the sensors and the switches to the arithmetic processor 90. The output circuit 93 is connected with electric loads such as a gate drive circuit which drive on/off of the switching devices, and is provided with a driving circuit and the like for outputting a control signal from the arithmetic processor 90.

Then, the arithmetic processor 90 runs software items (programs) stored in the storage apparatus 91 such as a ROM and collaborates with other hardware devices in the controller 10, such as the storage apparatus 91, the input circuit 92, and the output circuit 93, so that the respective functions of the control units 31 to 36 provided in the controller 10 are realized. Various kinds of setting data items to be utilized in the control units 31 to 36 are stored, as part of software items (programs), in the storage apparatus 91 such as ROM. Each function of the controller 10 will be explained in detail below.

1-4-1. Basic Control

<Rotation Detection Unit 31>

The rotation detection unit 31 detects a magnetic pole position θ (a rotational angle θ of the rotor) and a rotational angle speed ω of the rotor in an electrical angle. In the present embodiment, the rotation detection unit 31 detects the magnetic pole position θ (the rotational angle θ) and the rotational angle speed ω of the rotor, based on the output signal of the rotation sensor 2. In the present embodiment, the magnetic pole position is set to a direction of the N pole of the permanent magnet provided in the rotor. The rotational angle speed ω is calculated by differentiating the rotational angle θ. The rotation detection unit 31 may estimate the rotational angle (the magnetic pole position) without using the rotation sensor, based on current information which is obtained by superimposing a harmonic wave component on the current command value (so-called, sensorless system).

<Current Detection Unit 32>

The current detection unit 32 detects currents Ius, Ivs, Iws which flow into the three-phase windings, based on the output signal of the current sensor 6. The current detection unit 32 detects the current Ius which flows into the winding of U phase, detects the current Ivs which flows into the winding of V phase, and detects the current Iws which flows into the winding of W phase, based on the output signal of the current sensor 6. The current sensor 6 may detect the winding currents of two phases, and the winding current of the remaining one phase may be calculated based on the detection values of winding currents of two phases. For example, the current sensor 6 may detect the winding currents Ivs, Iws of V phase and W phase, and the winding current Ius of U phase may be calculated by Ius=−Ivs−Iws.

<Current Coordinate Conversion Unit 33>

The current coordinate conversion unit 33 converts the current detection values Ius, Ivs, Iws of the three-phase windings into a current detection value of d-axis Ids and a current detection value of q-axis Iqs, based on the rotational angle θ. In the present embodiment, as shown in the next equation, the current coordinate conversion unit 33 converts the current detection values of three-phase windings Ius, Ivs, Iws into the current detection values of d-axis and q-axis Ids, Iqs, by performing a three-phase/two-phase conversion and a rotating coordinate conversion, based on the rotational angle θ.

[Equation 1]

$$\begin{bmatrix} I_{ds} \\ I_{qs} \end{bmatrix} = \sqrt{\frac{2}{3}} \begin{bmatrix} \cos\theta & \cos\left(\theta - \frac{2\pi}{3}\right) & \cos\left(\theta + \frac{2\pi}{3}\right) \\ -\sin\theta & -\sin\left(\theta - \frac{2\pi}{3}\right) & -\sin\left(\theta + \frac{2\pi}{3}\right) \end{bmatrix} \begin{bmatrix} I_{us} \\ I_{vs} \\ I_{ws} \end{bmatrix} \quad (1)$$

The d-axis is defined in a direction of the magnetic pole (the N pole) of the magnet, and the q-axis is defined in a direction advanced to the d-axis by 90 degrees in the electrical angle.

<Voltage Command Value Calculation Unit 35>

The voltage command value calculation unit 35 is provided with a current control unit 351, a q-axis voltage limitation unit 352, and a voltage coordinate conversion unit 353. The current control unit 351 changes a voltage command value of d-axis Vdo and a voltage command value of q-axis Vqo so that the current detection value of d-axis Ids approaches the current command value of d-axis Ido, and the current detection value of q-axis Iqs approaches the current command value of q-axis Iqo. Calculation of the current command values of d-axis and q-axis Ido, Iqo by the current command value calculation unit 34 is described below. For example, the voltage command value calculation unit 35 performs a proportional-integral control, as shown in the next equation.

[Equation 2]

$$V_{do} = K_d\left(1 + \frac{1}{T_d s}\right)(I_{do} - I_{ds})$$

$$V_{qo} = K_d\left(1 + \frac{1}{T_q s}\right)(I_{qo} - I_{qs})$$

(2)

Herein, Kd and Kq are proportional gains, Td and Tq are integral times, and s is Laplace operator.

A feedforward control for non-interfering between the current of d-axis and the current of q-axis may be performed. That is, "−ω×Lq×Iqo" may be added to the voltage command value of d-axis Vdo, and "ω×(Ld×Ido+ψ)" may be added to the voltage command value of q-axis Vqo. Lq is an inductance of q-axis, Ld is an inductance of d-axis, W is an interlinkage flux that the magnetomotive force of the magnet interlinks to the winding.

The q-axis voltage limitation unit 352 limits the voltage command value of q-axis Vqo based on the DC voltage Vdc and the voltage command value of d-axis Vdo so that the voltage command values of three-phase Vuo, Vvo, Vwo do not exceed a range of the maximum applied voltage Vdc/Km according to the DC voltage Vdc. For example, as shown in the next equation, the q-axis voltage limitation unit 352 performs an upper limitation and a lower limitation to the voltage command value of q-axis Vqo so that the voltage command value of q-axis Vqo does not exceed an upper limitation value VqlmtH and a lower limitation value VqlmtL which are calculated based on the maximum applied voltage Vdc/Km and the voltage command value of d-axis Vdo; and calculates a value after the upper limitation and the lower limitation as a final voltage command value of q-axis Vqo.

[Equation 3]

$$V_{qlmtH} = \sqrt{\frac{V_{dc}^2}{K_m^2} - V_{do}^2}, \quad V_{qlmtL} = -\sqrt{\frac{V_{dc}^2}{K_m^2} - V_{do}^2}$$

(3)

1) IN CASE OF $V_{qo} > V_{qlmtH}$ $V_{qo} = V_{qlmtH}$

2) IN CASE OF $V_{qlmtH} > V_{qo} > V_{qlmtL}$ $V_{qo} = V_{qo}$

3) IN CASE OF $V_{qlmtL} > V_{qo}$ $V_{qo} = V_{qlmtL}$

Herein, Km is a coefficient corresponding to a voltage utilization factor, and is set according to presence or absence of a modulation, such as the third order harmonic wave superimposing, as shown in the next equation.

[Equation 4]

$$\begin{aligned} &1)\text{ IN CASE OF ABSENCE OF MODULATION } K_m = 2\sqrt{\frac{2}{3}} \\ &2)\text{ IN CASE OF PRESENCE OF MODULATION } K_m = \sqrt{2} \end{aligned} \quad (4)$$

According to this configuration, the voltage command value of d-axis Vdo can be changed preferentially along with a voltage limit circle corresponding to the maximum applied voltage Vdc/Km, and the voltage command value of q-axis Vqo can be changed subordinately. Accordingly, as described later, corresponding to a configuration that the current command value of d-axis Ido is preferentially changed in the magnetic flux weakening control, the voltage command value of d-axis Vdo is changed preferentially, and the current of d-axis Id can be changed preferentially.

The q-axis voltage limitation unit 352 may perform a low pass filter processing to the voltage command value of d-axis Vdo used for the limitation processing of the voltage command value of q-axis Vqo. The voltage command value of d-axis Vdo vibrates, and the voltage command value of q-axis Vqo vibrates. As described above, by using a value obtained by performing the low pass filter processing to the voltage command value of d-axis Vdo, vibration of the voltage command value of q-axis Vqo is suppressed, and vibration of the rotary electric machine and unwanted sound can be reduced.

The voltage coordinate conversion unit 353 converts the voltage command values of d-axis and q-axis Vdo, Vqo into the voltage command values of three-phase Vuo, Vvo, Vwo, based on the rotational angle θ. In the present embodiment, as shown in the next equation, the voltage coordinate conversion unit 353 converts the voltage command values of d-axis and q-axis Vdo, Vqo into the voltage command values of three-phase Vuo, Vvo, Vwo, by performing a fixed coordinate conversion and a two-phase/three-phase conversion based on the rotational angle θ.

[Equation 5]

$$\begin{bmatrix} V_{uo} \\ V_{vo} \\ V_{wo} \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} V_{do} \\ V_{qo} \end{bmatrix} \quad (5)$$

The voltage coordinate conversion unit 353 may add well-known modulation, such as the two-phase modulation and the third order harmonic wave superimposing, to the voltage command values of three-phase Vuo, Vvo, Vwo, in order to improve the voltage utilization factor.

<Switching Control Unit 36>

The switching control unit 36 turns on and off the plurality of switching devices provided in the inverter 4, based on the voltage command values of three-phase Vuo, Vvo, Vwo. The switching control unit 36 uses well-known the carrier wave comparison PWM or the space vector PWM.

In the case where the carrier wave comparison PWM is used, the switching control unit 36 compares a carrier wave with each of the voltage command values of three-phase Vuo, Vvo, Vwo, and turns on and off the plurality of switching devices based on a comparison result. The carrier wave is a triangular wave which vibrates with an amplitude of half value of DC voltage Vdc/2 centering on 0, at the PWM period Tc. About each phase, the switching control unit 36 turns on the switching signal GP of the positive electrode side switching device and turns on the positive electrode side switching device when the carrier wave is less than the voltage command value; and turns off the switching signal GP of the positive electrode side switching device and turns off the positive electrode side switching device when the carrier wave exceeds the voltage command value. On the other hand, about each phase, the switching control unit 36 turns off the switching signal GN of the negative electrode side switching device and turns off the negative electrode side switching device when the carrier wave is less than the voltage command value; and turns on the switching signal GN of the negative electrode side switching device and turns on the negative electrode side switching device when the carrier wave exceeds the voltage command value. About each phase, between the on period of the positive electrode side switching device and the on period of the negative electrode side switching device, a short circuit prevention period (dead time) when both of the positive electrode side and the negative electrode side switching device are turned off may be provided.

In the case where the space vector PWM is used, the switching control unit 36 generates a voltage command vector from the voltage command values of three-phase Vuo, Vvo, Vwo; determines an output time allocation of seven basic voltage vectors in the PWM period, based on the voltage command vector; and generates the switching signal which turns on and off each switching device in the PWM period, based on the output time allocation of seven basic voltage vectors.

1-4-2. Current Command Value Calculation Unit 34

The current command value calculation unit 34 calculates a current command value of d-axis Ido and a current command value of q-axis Iqo. In the present embodiment, the current command value calculation unit 34 is provided with a base current command value calculation unit 341, a d-axis current command value change unit 342, a d-axis current command value limitation unit 343, and a q-axis current command value limitation unit 344.

1-4-2-1. Base Current Command Value Calculation Unit 341

The base current command value calculation unit 341 calculates a base current command value of d-axis Idob and a base current command value of q-axis Iqob. In the present embodiment, the base current command value calculation unit 341 detects a steering wheel torque of driver Ts, based on the output signal of the torque sensor 106. Then, as shown in the next equation, the base current command value calculation unit 341 sets the base current command value of q-axis Iqob, based on the steering torque Ts, and sets the base current command value of d-axis Idob to 0. That is to say, the Id=0 control is performed. In the Id=0 control, the base current command value of d-axis Idob is set to 0. The Id=0 control is suitable for the surface magnet type rotary electric machine of the present embodiment. In the surface magnet type rotary electric machine, the d-axis inductance Ld and the q-axis inductance Lq become almost equal, and torque changes in proportion to the current of q-axis Iq.

[Equation 6]

$$I_{qob}=K_a T_s$$

$$I_{dob}=0 \tag{6}$$

Herein, Ka is a constant, but it may be changed according to the steering torque Ts, the travelling speed of vehicle, and the like. The base current command value of q-axis Iqob may be set using the well-known compensation control according to the steering condition.

In the case of the embedded magnet type rotary electric machine, instead of the Id=0 control, the base current command values of d-axis and q-axis Idob, Iqob may be set by other control method, such as the maximum torque/current control. In the maximum torque/current control, the base current command values of d-axis and q-axis Idob, Iqob which maximize the generated torque with respect to the same current are calculated.

1-4-2-2. Magnetic Flux Weakening Control

<Problem of Magnetic Flux Weakening Control which does not Use Information on Inductance and Interlinkage Flux>

The voltage equation of the rotary electric machine becomes like the next equation.

[Equation 7]

$$\begin{bmatrix} V_d \\ V_q \end{bmatrix} = \begin{bmatrix} R+sL_d & -\omega L_q \\ \omega L_d & R+sL_q \end{bmatrix} \begin{bmatrix} I_d \\ I_q \end{bmatrix} + \begin{bmatrix} 0 \\ \omega \varphi \end{bmatrix} \tag{7}$$

Herein, Vd is an applied voltage of d-axis, Vq is an applied voltage of q-axis, Id is a current of d-axis, Iq is a current of q-axis, s is Laplace operator, R is a winding resistor, W is an interlinkage flux by the rotor magnet, Ld is a d-axis inductance, and Lq is q-axis inductance.

In the equation (7), a term that the rotational angle speed ω is multiplied is a term of an induced voltage which is generated in the winding, as shown in the next equation. The induced voltage of d-axis Vdi and the induced voltage of q-axis Vqi increase, as the rotational angle speed ω increases.

[Equation 8]

$$\begin{bmatrix} V_{di} \\ V_{qi} \end{bmatrix} = \begin{bmatrix} 0 & -\omega L_q \\ \omega L_d & 0 \end{bmatrix} \begin{bmatrix} I_d \\ I_q \end{bmatrix} + \begin{bmatrix} 0 \\ \omega \varphi \end{bmatrix} \tag{8}$$

The induced voltage Vi becomes as shown in the next equation. Since the winding current amount which can be energized decreases when the induced voltage Vi approaches the maximum applied voltage Vdc/Km which can be applied, the torque of the rotary electric machine decreases.

[Equation 9]

$$V_i = \sqrt{V_{di}^2 + V_{qi}^2} = \omega\sqrt{(L_q I_q)^2 + (L_d I_d + \varphi)^2} \tag{9}$$

Then, as seen from the equation (9), the magnetic flux weakening control which generates a magnetic flux which weakens the interlinkage flux ψ of the rotor by increasing the current of d-axis Id in the negative direction, decreases the induced voltage Vi, and increases the winding current amount is generally performed.

And, as shown in the next equation, the winding current is upper-limited by the maximum current value Imax of the winding current which can be supplied. It is necessary to control the current of d-axis Id and the current of q-axis Iq within a range of the current limit circle expressed by the equation (10).

[Equation 10]

$$I_d^2 + I_q^2 \leq I_{max}^2 \tag{10}$$

And, as shown in the next equation, the current of d-axis Id and the current of q-axis Iq are limited so as to become within a range of the voltage limit ellipse where the induced voltage Vi coincides with the maximum applied voltage Vdc/Km which can be applied.

[Equation 11]

$$(L_q I_q)^2 + (L_d I_d + \varphi)^2 \leq \left(\frac{V_{dc}}{K_m}\frac{1}{\omega}\right)^2 \tag{11}$$

Figure 4:
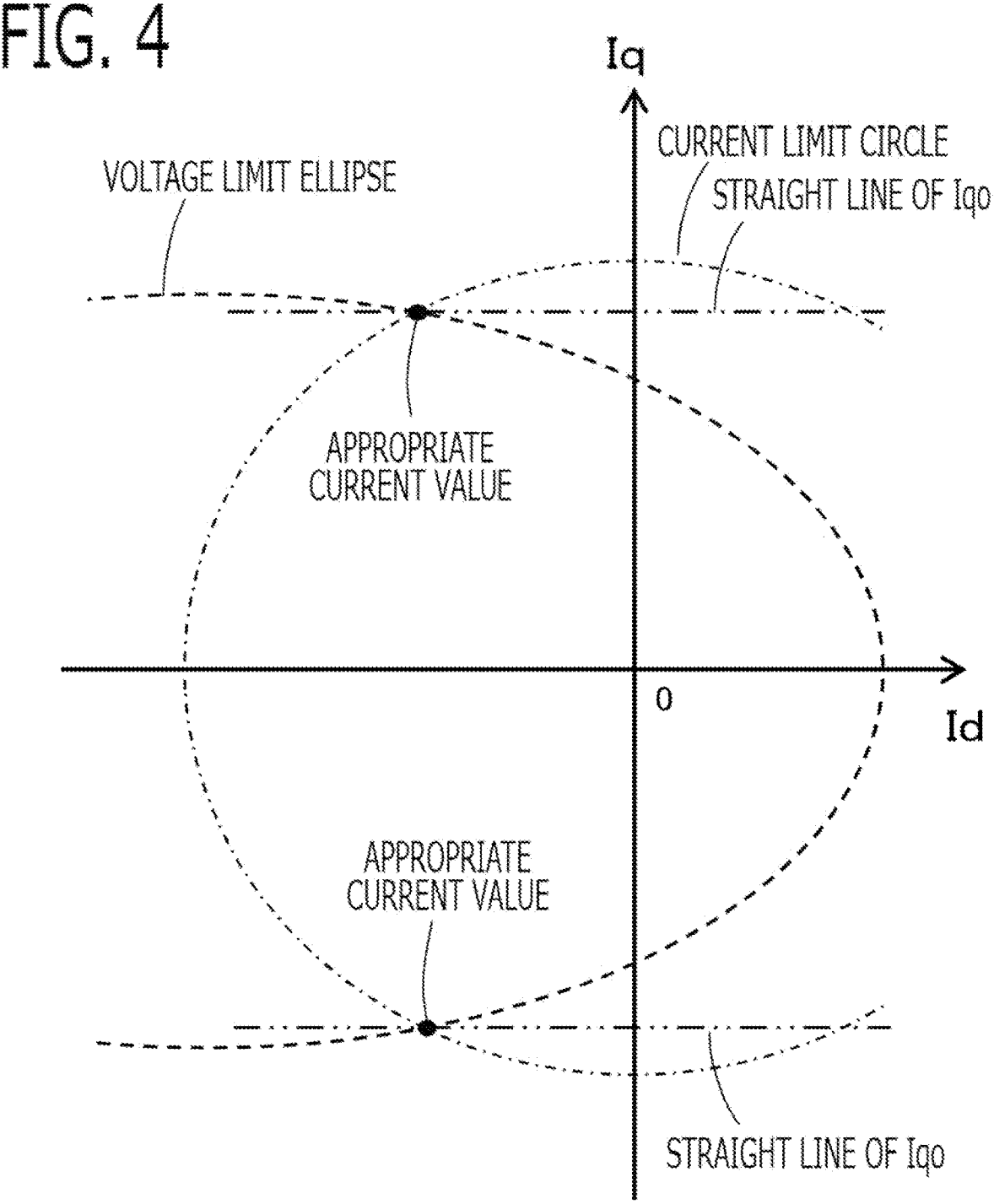
FIG. 4 is a figure for explaining the magnetic flux weakening control according to Embodiment 1.

As shown in FIG. 4, the current of d-axis Id and the current of q-axis Iq which obtain a desired torque at a certain rotational angle speed ω in the range of the magnetic flux weakening control become an intersection point between the voltage limit ellipse and the current command value of q-axis Iqo. When the current command value of q-axis Iqo is limited by the current limit circle, these become an intersection point between the voltage limit ellipse and the current limit circle.

However, in order to set this kind the optimal current command values of d-axis and q-axis in feedforward as conventional, accurate information of the inductances Ld, Lq of d-axis and q-axis, and the interlinkage flux ψ of the rotor which are related to the voltage limit ellipse is necessary. However, if the accurate information of the inductances Ld, Lq, and the interlinkage flux ψ of the rotor cannot be obtained, the optimal current command values of d-axis and q-axis cannot be set in feedforward. Alternatively, if the inductances Ld, Lq, and the interlinkage flux ψ of the rotor are varied due to an aging change or a temperature characteristic. Setting accuracy of the current command values of d-axis and q-axis is deteriorated.

Figure 5:
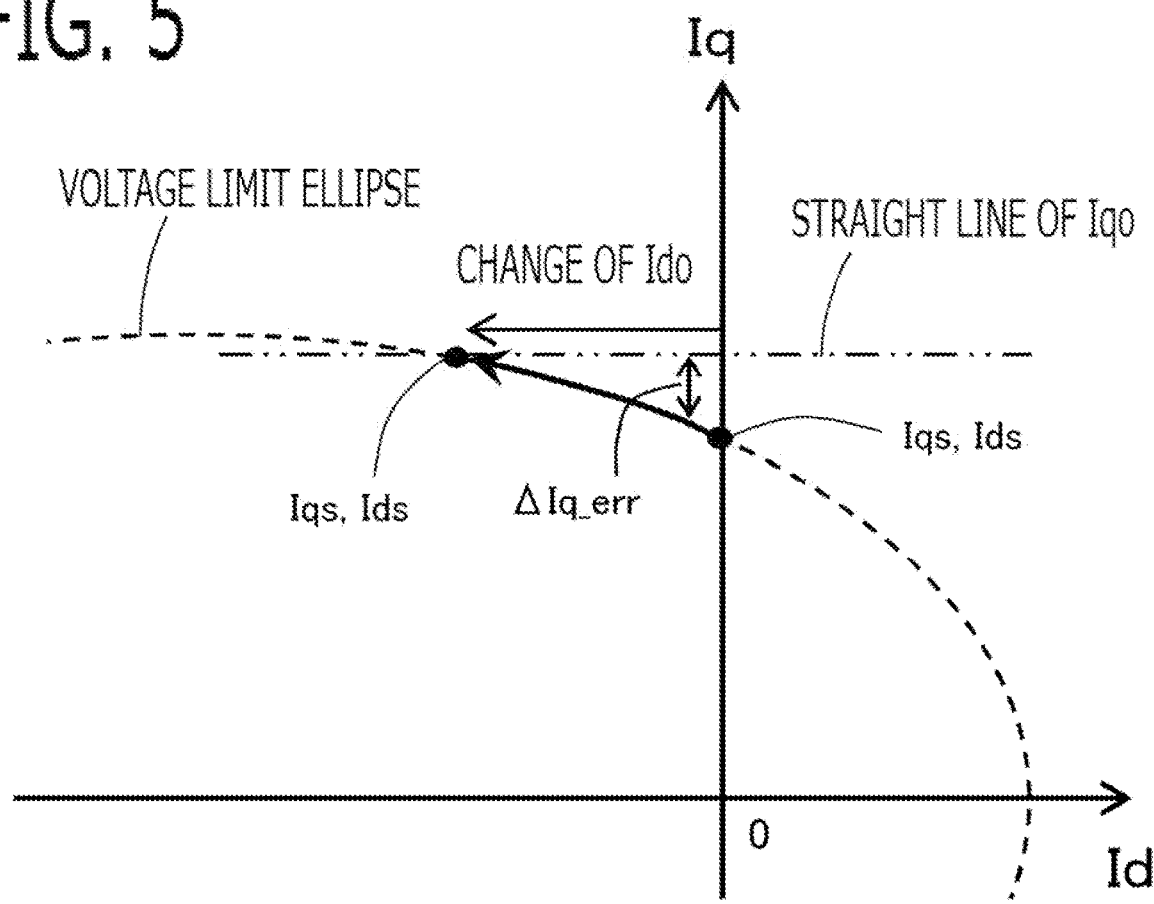
FIG. 5 is a figure for explaining the magnetic flux weakening control according to a comparative example.
Figure 6:
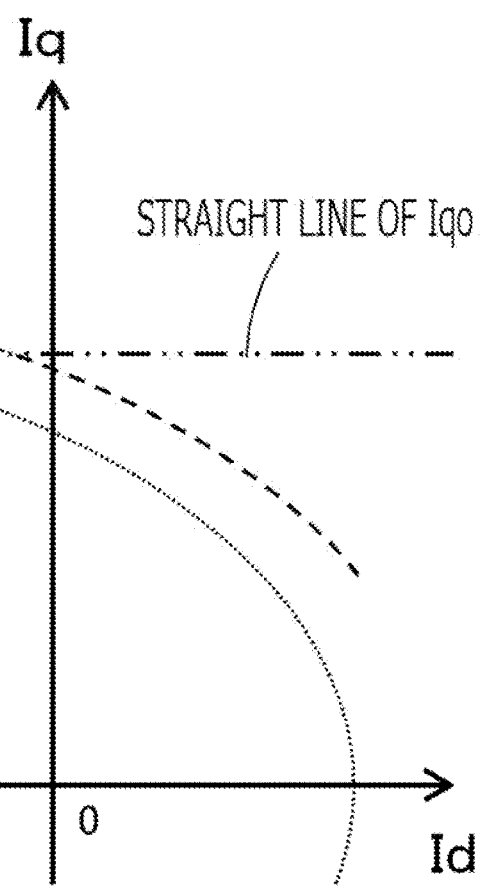
FIG. 6 is a figure for explaining the magnetic flux weakening control according to a comparative example.

On the other hand, in the technology of patent document 1, the current command value of d-axis is increased or decreased by the proportional control or the integral control, based on the q-axis current deviation ΔIq_err between the current command value of q-axis and the current detection value of q-axis. In the technology of patent document 1, if the integral control is performed, as shown in FIG. 5, it may be considered that the current command value of d-axis Ido can be changed to the intersection point between the voltage limit ellipse and the current command value of q-axis Iqo, along with the voltage limit ellipse, until the q-axis current deviation ΔIq_err becomes 0. However, this is considered to work well in the state where the current command value of d-axis Ido and the current command value of q-axis Iqo are located outside the voltage limit ellipse, and the current of d-axis and the current of q-axis are limited by the voltage limit ellipse, by narrowing the voltage limit ellipse by increase in the rotational angle speed ω, or increasing the current command value of q-axis Iqo by increase in the target torque. On the other hand, as shown in FIG. 6, in the case where the current command value of d-axis Ido and the current command value of q-axis Iqo are located inside the voltage limit ellipse by expanding the voltage limit ellipse by decrease in the rotational angle speed ω, or decreasing the current command value of q-axis Iqo by decrease in the target torque, the current of d-axis and the current of q-axis are not limited by the voltage limit ellipse. Accordingly, the q-axis current deviation ΔIq_err is kept to 0, and the current of d-axis and the current of q-axis do not change toward the intersection point between the voltage limit ellipse and the current command value of q-axis Iqo, but these change in an unexpected direction by noise component and error component of the current of q-axis.

In this way, only by performing the integral control based on the q-axis current deviation ΔIq_err, and changing the current command value of d-axis Ido, the information of the inductances Ld, Lq, and the interlinkage flux ψ are not used. Accordingly, it cannot be determined whether the current command values of d-axis and q-axis are located outside or inside the voltage limit ellipse, and the optimal current command values of d-axis and q-axis of the magnetic flux weakening control which maximize torque cannot be set in response to the change of operating condition, such as increase and decrease in the rotational angle speed ω, and increase and decrease in the target torque.

Then, it is desirable to provide the controller which can control the current of d-axis Id and the current of q-axis Iq in the vicinity of the intersection point between the voltage limit ellipse and the current command value of q-axis Iqo, irrespective of increase and decrease in the rotational angle speed ω and the target torque, without using the information of the inductances Ld, Lq and the interlinkage flux ψ of the rotor, in the magnetic flux weakening control, and perform the weakening magnetic flux appropriately and increase torque.

<d-Axis Current Command Value Change Unit 342>

FIG. 7 shows the block diagram of the d-axis current command value change unit 342. When the current command value of q-axis Iqo is a positive value, the d-axis current command value change unit 342 changes the current command value of d-axis Ido, based on a deviation ΔIq_erroff (hereinafter, referred to as a q-axis current offset deviation ΔIq_erroff) between an offset q-axis current command value Iqoffo obtained by subtracting the q-axis offset value ΔIqoff of the positive value from the current command value of q-axis Iqo, and the current detection value of q-axis Iqs.

[Equation 12]

1) IN CASE OF $I_{qo} > 0$ $$I_{qoffo} = I_{qo} - \Delta I_{qoff}, \Delta I_{qoff} > 0$$

$$\Delta I_{q\_erroff} = I_{qoffo} - I_{qs} \quad (12)$$

An order of addition and subtraction of Iqo, Iqs, and ΔIqoff in FIG. 7 is an example. Any order of addition and subtraction that ΔIq_erroff=Iqo−Iqs−ΔIqoff is established in the case of Iqo>0, and ΔIq_erroff=Iqo−Iqs+ΔIqoff is established in the case of Iqo<0 described below is within the scope of the present invention.

According to this configuration, when the current of q-axis is upper-limited by the voltage limit ellipse, an increase amount in the negative direction of the current command value of d-axis Ido is increased or decreased so as to move to an intersection point between the voltage limit ellipse and a straight line which is decreased by the q-axis offset value ΔIqoff from the current command value of q-axis Iqo. When the current command value of q-axis Iqo is limited by the current limit circle, it moves to an intersection point between the voltage limit ellipse and a circle which is decreased by the q-axis offset value ΔIqoff from the current limit circle. At this time, since the current detection value of q-axis Iqs is below the current command value of q-axis Iqo by the q-axis offset value ΔIqoff, the voltage command value of q-axis Vqo can be stuck to an upper limitation value VqlmtH by the voltage limit circle, and the voltage utilization factor can be maintained at the maximum value. In the case where the q-axis offset value ΔIqoff is larger than an amplitude of the noise component of the current detection value of q-axis Iqs, even if the noise component occurs, the voltage command value of q-axis Vqo can be stuck to the upper limitation value VqlmtH, and the strange noise and the unwanted sound of the rotary electric machine can be reduced.

Figure 8:
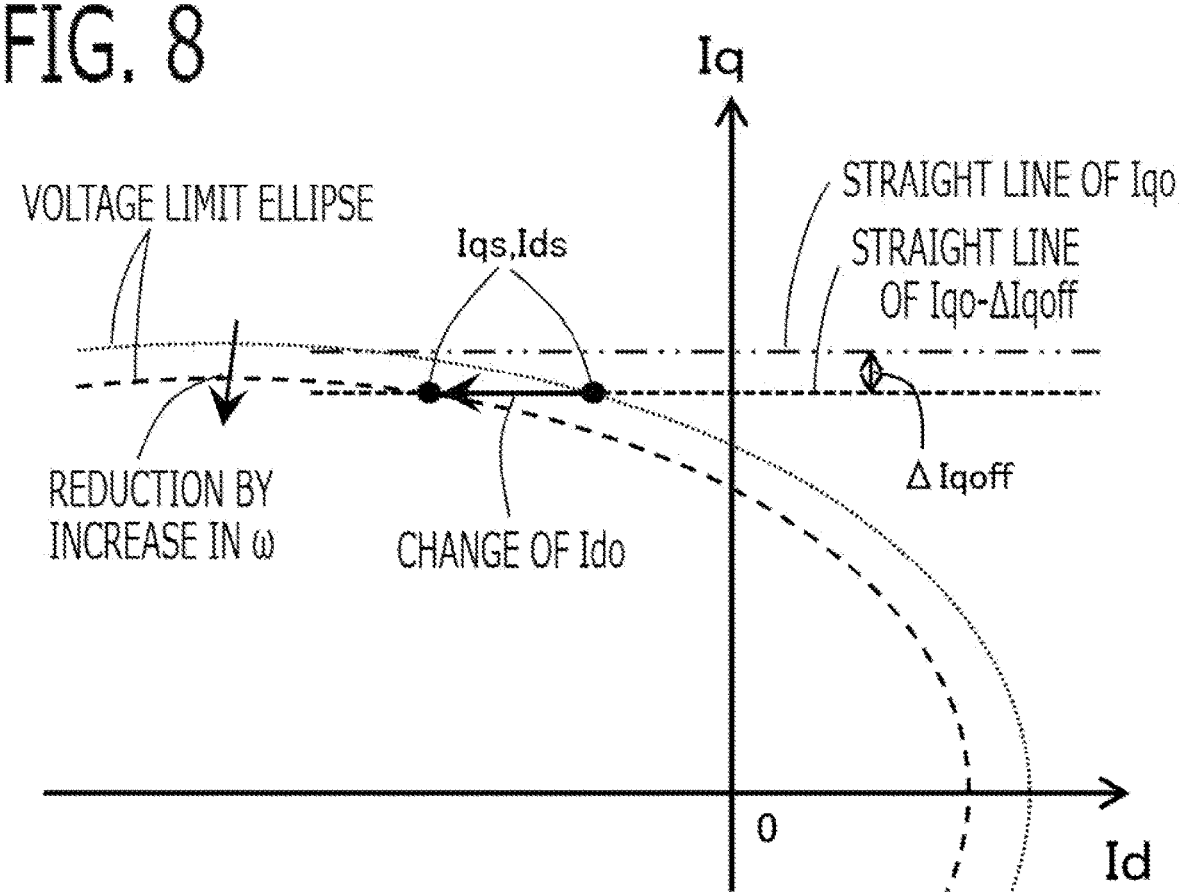
FIG. 8 is a figure for explaining the control behavior when Iqo>0 according to Embodiment 1.
Figure 9:
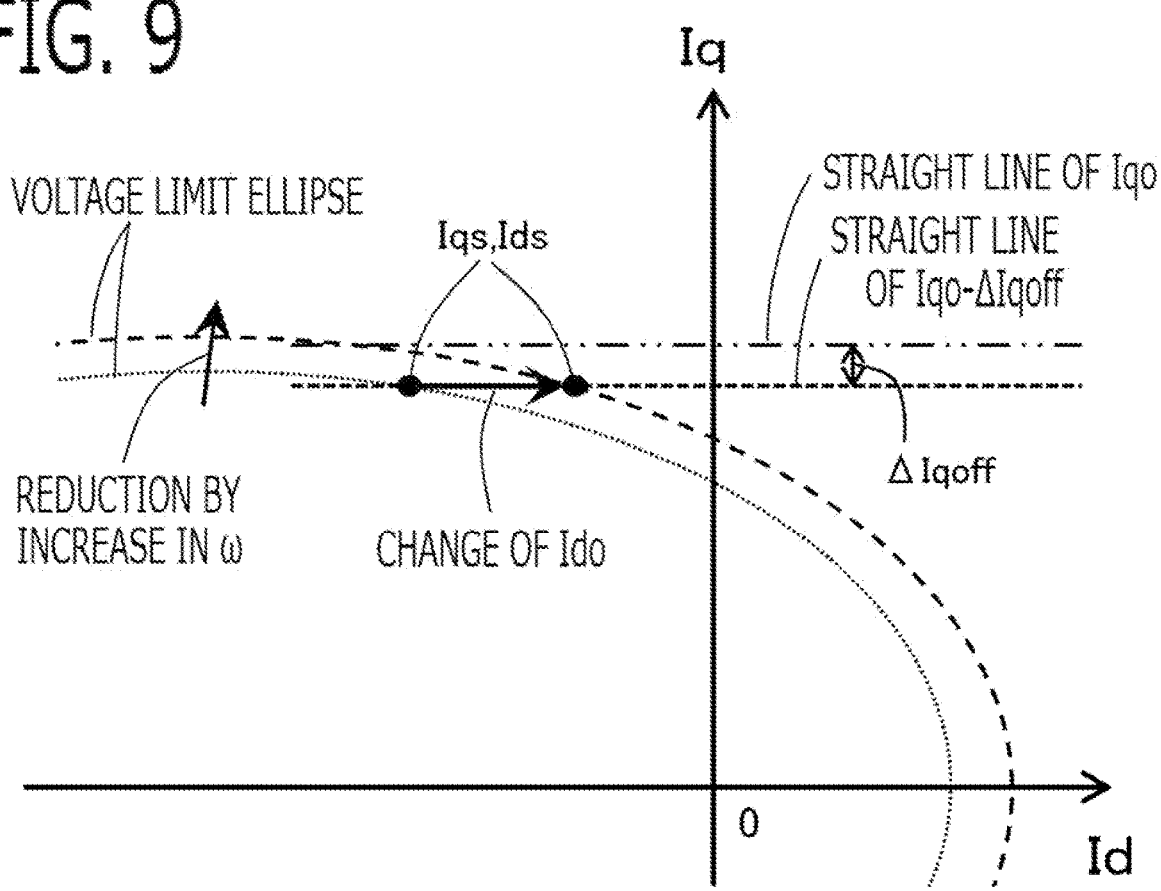
FIG. 9 is a figure for explaining the control behavior when Iqo>0 according to Embodiment 1.

For example, as shown in FIG. 8, when the rotational angle speed ω increases in the voltage saturation state of the voltage command values, the induced voltage increases and the current of q-axis decreases. Accordingly, the current command value of d-axis Ido is increased in the negative direction in order to keep the q-axis offset value ΔIqoff, and it moves to an intersection point between the voltage limit ellipse which is narrowed by the increase in the rotational angle speed ω, and the straight line which is decreased by the q-axis offset value ΔIqoff from the current command value of q-axis Iqo. On the other hand, as shown in FIG. 9, when the rotational angle speed ω decreases in the voltage saturation state of the voltage command values, the induced voltage decreases and the current of q-axis increases. Accordingly, the current command value of d-axis Ido is increased in the positive direction in order to keep the q-axis offset value ΔIqoff, and it moves to an intersection point between the voltage limit ellipse which is expanded by the decrease in the rotational angle speed ω, and the straight line which is decreased by the q-axis offset value ΔIqoff from the current command value of q-axis Iqo. Accordingly, only by performing the feedback control which provided the q-axis offset value ΔIqoff without using the information of the inductances Ld, Lq, and the interlinkage flux ψ of the rotor, the voltage limit ellipse which changes according to the rotational angle speed ω is followed automatically, the current of d-axis Id and the current of q-axis Iq are controlled at an intersection point between the voltage limit ellipse and the straight line which is decreased by the q-axis offset value ΔIqoff from the current command value of q-axis Iqo, the weakening magnetic flux can be performed appropriately and torque can be increased.

Figure 10:
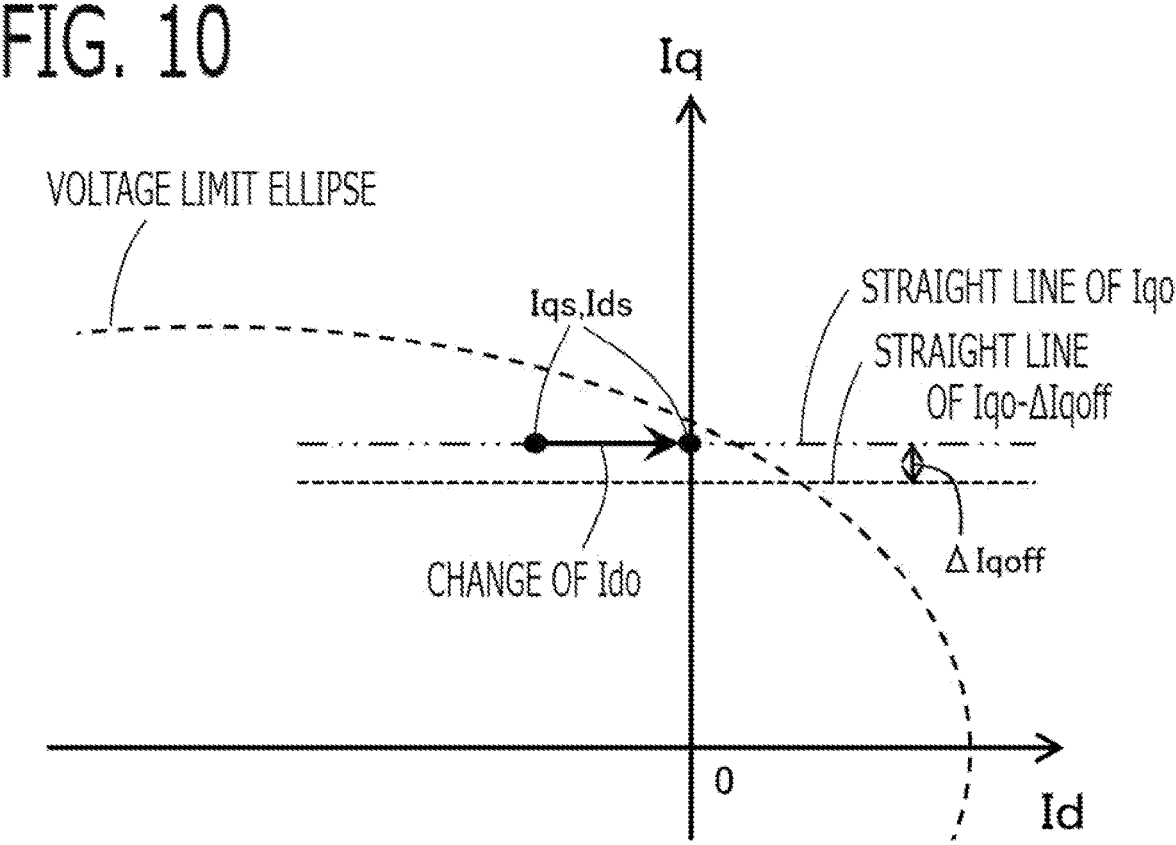
FIG. 10 is a figure for explaining the control behavior when Iqo>0 according to Embodiment 1.

On the other hand, as shown in FIG. 10, when a value obtained by subtracting the q-axis offset value ΔIqoff from the current command value of q-axis Iqo is inside the voltage limit ellipse, the current of q-axis follows the current command value of q-axis Iqo. Accordingly, in order to keep the q-axis offset value ΔIqoff, the current command value of d-axis Ido is increased in the positive direction, the increase amount in the negative direction of the current command value of d-axis Ido becomes 0, and the magnetic flux weakening control is not performed.

In the case where the current command value of q-axis Iqo is a positive value, the d-axis current command value change unit 342 decreases the current command value of d-axis Ido, when the current detection value of q-axis Iqs is less than the offset q-axis current command value Iqoffo (ΔIq_erroff>0); and increases the current command value of d-axis Ido, when the current detection value of q-axis Iqs exceeds the offset q-axis current command value Iqoffo (ΔIq_erroff<0).

The d-axis current command value change unit 342 calculates a d-axis current command value change amount ΔIdo, based on the q-axis current offset deviation ΔIq_erroff, and calculates the current command value of d-axis Ido by adding the d-axis current command value change amount ΔIdo to the base current command value of d-axis Idob. For example, the d-axis current command value change unit 342 calculates the d-axis current command value change amount ΔIdo by performing a proportional-integral control based on the q-axis current offset deviation ΔIq_erroff.

[Equation 13]

$$1) \text{ IN CASE OF } I_{qo} > 0 \quad (13)$$

$$\Delta I_{do} = -K_{pid}\left(1 + \frac{1}{T_{iid}s}\right)\Delta I_{q\_erroff}, K_{pid} > 0$$

$$I_{do} = I_{dob} + \Delta I_{do}$$

Herein, Kpid is a proportional gain for d-axis current command value calculation which is set to a positive value, Tiid is an integral time for d-axis current command value calculation, and s is a Laplace operator. Setting method of the proportional gain Kpid for d-axis current command value calculation and the integral time Tiid is described below. Instead of the proportional-integral control, any feedback control, such as the integral control, the proportional control, or the proportional-integral-differential control, may be used.

<In Case of Current Command Value of q-Axis Iqo<0>

On the other hand, in the case where the current command value of q-axis Iqo is a negative value, the d-axis current command value change unit 342 changes the current command value of d-axis Ido, based on the deviation ΔIq_erroff (the q-axis current offset deviation) between the offset q-axis current command value Iqoffo obtained by adding the q-axis offset value ΔIqoff of the positive value to the current command value of q-axis Iqo, and the current detection value of q-axis Iqs.

[Equation 14]

$$2) \text{ IN CASE OF } I_{qo} < 0$$

$$I_{qoffo} = I_{qo}\Delta I_{qoff}, \Delta I_{qoff} > 0$$

$$\Delta I_{q\_erroff} = I_{qoffo} - I_{qs} \quad (14)$$

According to this configuration, when the q-axis current is lower-limited by the voltage limit ellipse, an increase amount in the negative direction of the current command value of d-axis Ido is increased or decreased so as to move to an intersection point between the voltage limit ellipse and a straight line which is increased by the q-axis offset value ΔIqoff from the current command value of q-axis Iqo. When the current command value of q-axis Iqo is limited by the current limit circle, it moves to an intersection point between the voltage limit ellipse and a circle which is increased by the q-axis offset value ΔIqoff from the current limit circle. At this time, since the current of q-axis exceed the current command value of q-axis Iqo by the q-axis offset value ΔIqoff, the voltage command value of q-axis Vqo can be stuck to a lower limitation value VqlmtL by the voltage limit circle, and the voltage utilization factor can be maintained at the maximum value. In the case where the q-axis offset value ΔIqoff is larger than an amplitude of the noise component of the current detection value of q-axis Iqs, even if the noise component occurs, the voltage command value of q-axis Vqo can be stuck to the lower limitation value VqlmtL, and the strange noise and the unwanted sound of the rotary electric machine can be reduced.

Figure 11:
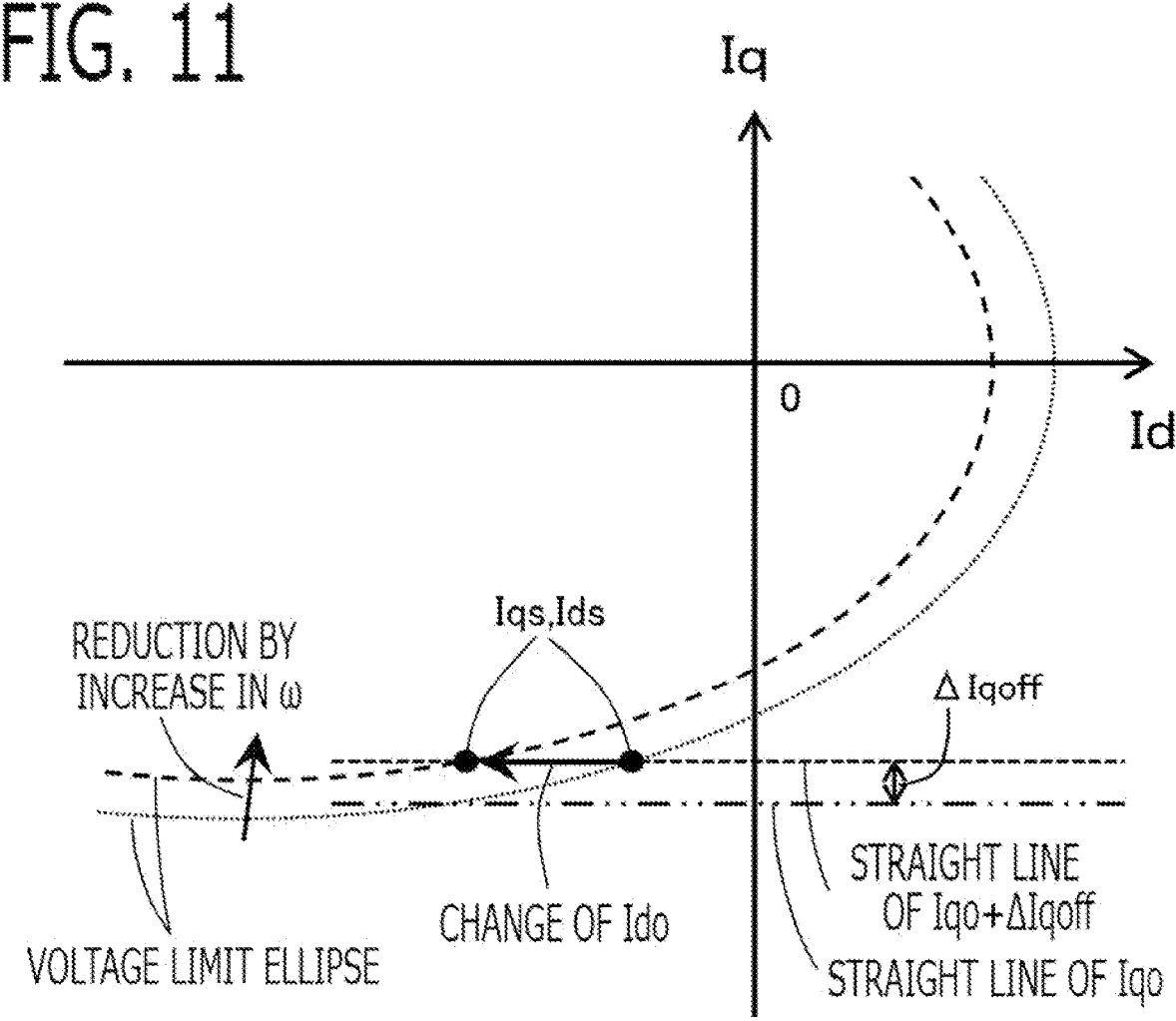
FIG. 11 is a figure for explaining the control behavior when Iqo<0 according to Embodiment 1.
Figure 12:
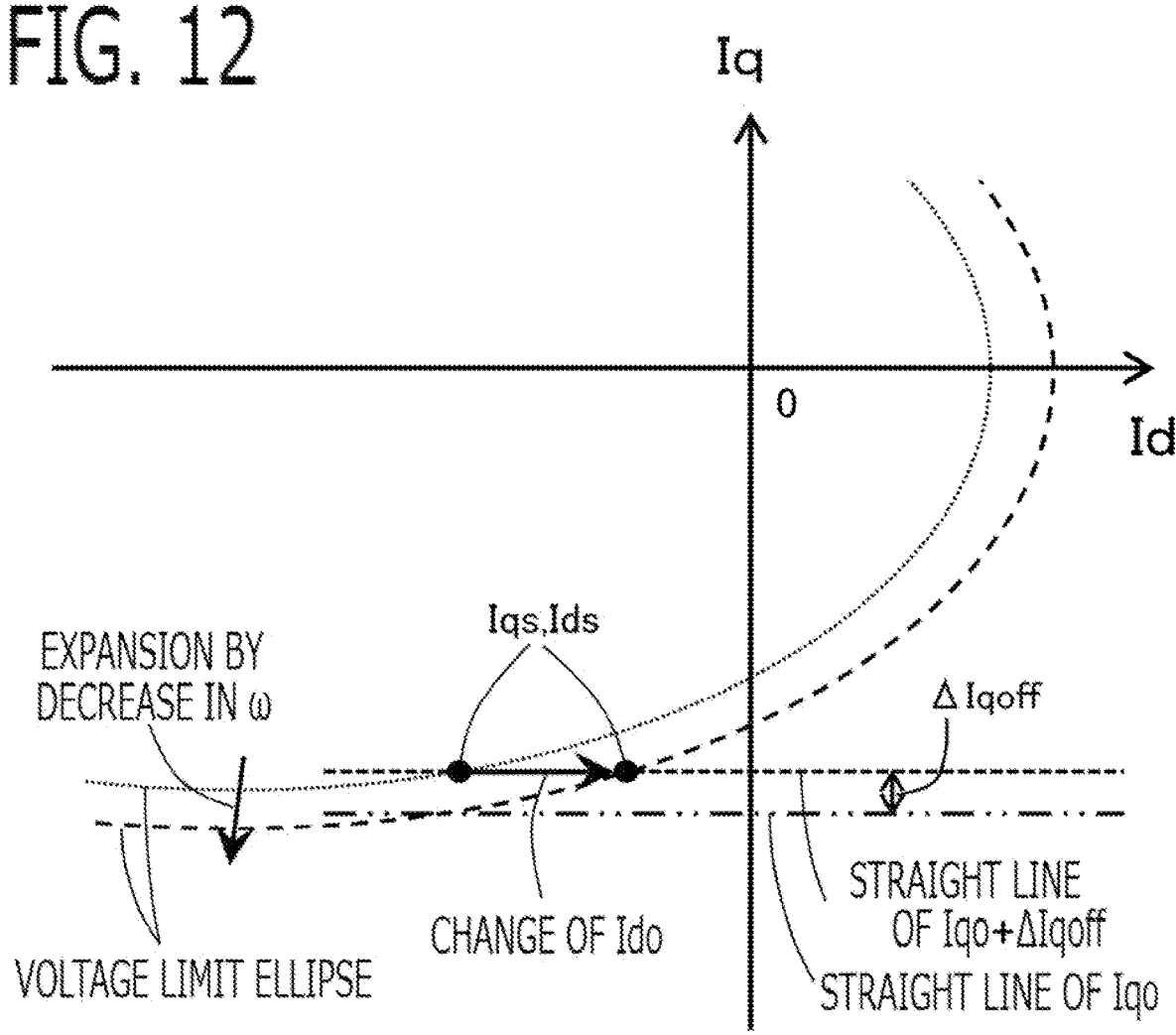
FIG. 12 is a figure for explaining the control behavior when Iqo<0 according to Embodiment 1.

For example, as shown in FIG. 11, when the rotational angle speed ω increases in the voltage saturation state of the voltage command values, the induced voltage increases and the negative current of q-axis increases. Accordingly, the current command value of d-axis Ido is increased in the negative direction in order to keep the q-axis offset value ΔIqoff, and it moves to an intersection point between the voltage limit ellipse which is narrowed by the increase in the rotational angle speed ω, and the straight line which is increased by the q-axis offset value ΔIqoff from the current command value of q-axis Iqo. On the other hand, as shown in FIG. 12, when the rotational angle speed ω decreases in the voltage saturation state of the voltage command values, the induced voltage decreases and the negative current of q-axis decreases. Accordingly, the current command value of d-axis Ido is increased in the positive direction in order to keep the q-axis offset value ΔIqoff, and it moves to an intersection point between the voltage limit ellipse which is expanded by the decrease in the rotational angle speed ω, and the straight line which is increased by the q-axis offset value ΔIqoff from the current command value of q-axis Iqo. Accordingly, only by performing the feedback control which provided the q-axis offset value ΔIqoff without using the information of the inductances Ld, Lq, and the interlinkage flux ψ of the rotor. The voltage limit ellipse which changes according to the rotational angle speed ω is followed automatically, the current of d-axis Id and the current of q-axis Iq are controlled at an intersection point between the voltage limit ellipse and the straight line which is increased by the q-axis offset value ΔIqoff from the current command value of q-axis Iqo, the weakening magnetic flux can be performed appropriately and the absolute value of negative torque can be increased.

In the case where the current command value of q-axis Iqo is a negative value, the d-axis current command value change unit 342 decreases the current command value of d-axis Ido, when the current detection value of q-axis Iqs exceeds the offset q-axis current command value Iqoffo (ΔIq_erroff<0); and increases the current command value of d-axis Ido, when the current detection value of q-axis Iqs is less than the offset q-axis current command value Iqoffo (ΔIq_erroff>0).

In the case where the current command value of q-axis Iqo is a negative value, as shown in the next equation, the d-axis current command value change unit 342 calculates the d-axis current command value change amount ΔIdo by performing a proportional-integral control based on the q-axis current offset deviation ΔIq_erroff.

[Equation 15]

$$2) \text{ IN CASE OF } I_{qo} < 0 \quad (15)$$

$$\Delta I_{do} = K_{pid}\left(1 + \frac{1}{T_{iid}s}\right)\Delta I_{q\_erroff}, K_{pid} > 0$$

$$I_{do} = I_{dob} + \Delta I_{do}$$

<Upper and Lower Limitation of Current Command Value of d-Axis Ido>

As shown in the next equation, the d-axis current command value limitation unit 343 upper-limits the current command value of d-axis Ido by the upper limitation value IdlmtH, and lower-limits the current command value of d-axis Ido by the lower limitation value IdlmtL. The upper limitation value IdlmtH is set to the base current command value of d-axis Idob. The lower limitation value IdlmtL is set to a negative limit value for preventing occurrence of irreversible demagnetization of the permanent magnet of rotor.

[Equation 16]

$$I_{dlmtH}=I_{dob}, I_{dlmtL}<0$$

1) IN CASE OF $I_{do}>I_{dlmtH}$ $$I_{do}=I_{dlmtH}$$

2) IN CASE OF $I_{dlmtH}>I_{do}>I_{dlmtL}$ $$I_{do}=I_{do}$$

3) IN CASE OF $I_{dlmtL}>I_{do}$ $$I_{do}=I_{dlmtL} \quad (16)$$

In a region where the magnetic flux weakening control does not need to be executed, such a region where the rotational angle speed co is less than or equal to the base rotational angle speed, it may be forcibly set to Ido=Idob.

<q-Axis Current Command Value Limitation Unit 344>

The q-axis current command value limitation unit 344 limits the current command value of q-axis Iqo, based on the maximum current value Imax and the current command value of d-axis Ido, so that the current supplied to the three-phase windings does not exceed a range of the maximum current value Imax which can be supplied to the three-phase windings. For example, as shown in the next equation, the q-axis current command value limitation unit 344 performs an upper limitation and a lower limitation to the base current command value of q-axis Iqob so that the base current command value of q-axis Iqob does not exceed an upper limitation value IqlmtH and a lower limitation value IqlmtL which are calculated based on the maximum current value Imax and the current command value of d-axis Ido; and calculates a value after the upper limitation and the lower limitation as the current command value of q-axis Iqo. This limitation processing is a processing which limits the current command values of d-axis and q-axis Iqo, Ido within the range of the current limit circle of the maximum current value Imax.

[Equation 17]

$$I_{qlmtH}=\sqrt{I_{max}^2-I_{do}^2}, I_{qlmtL}=-\sqrt{I_{max}^2-I_{do}^2}$$

1) IN CASE OF $I_{qob}>I_{qlmtH}$ $$I_{qo}=I_{qlmtH}$$

2) IN CASE OF $I_{qlmtH}>I_{qob}>I_{qlmtL}$ $$I_{qo}=I_{qob}$$

3) IN CASE OF $I_{qlmtL}>I_{qob}$ $$I_{qo}=I_{qlmtL} \quad (17)$$

According to this configuration, when the base current command value of q-axis Iqob is limited by the current limit circle corresponding to the maximum current value Imax, the current command value of d-axis Ido can be changed preferentially along with the current limit circle corresponding to the maximum current value Imax, and the current command value of q-axis Iqo can be changed subordinately. Accordingly, in the magnetic flux weakening control, the current command value of d-axis Ido is changed preferentially, and the weakening magnetic flux amount is rationalized.

<Control Behavior>

A control behavior will be explained with reference to the time chart of FIG. 13. In a state where the base current command value of q-axis Iqob is a positive constant value smaller than the maximum current value Imax, the rotational angle speed ω increases gradually until the time t03, and the rotational angle speed ω decreases gradually after the time t03.

Until the time t01, since the rotational angle speed ω is low, the voltage limit ellipse is wide, the current command values of q-axis and d-axis Iqo, Ido are inside the voltage limit ellipse, and the current detection value of q-axis Iqs follows the current command value of q-axis Iqo. Accordingly, the q-axis current offset deviation ΔIq_erroff becomes a negative value of the q-axis offset value ΔIqoff, the d-axis current command value change amount ΔIdo is increased to 0, the current command value of d-axis Ido is set to 0, and the magnetic flux weakening control is not performed.

On the other hand, before the time t01, as the rotational angle speed ω increases gradually, the induced voltage increases gradually, and the voltage command value of q-axis Vqo is increased gradually by the current feedback control in order to maintain the current detection value of q-axis Iqs at the current command value of q-axis Iqo.

At the time t01, by increase in the rotational angle speed ω, the induced voltage increases, the voltage limit ellipse is narrowed, the current command values of q-axis and d-axis Iqo, Ido coincide with the voltage limit ellipse, and the voltage command value of q-axis Vqo reaches the voltage limit circle. Then, from the time t01 to the time t02, the current command values of q-axis and d-axis Iqo, Ido become outside the voltage limit ellipse, and the current detection value of q-axis Iqs is limited by the voltage limit ellipse, and decreases gradually from the current command value of q-axis Iqo. However, the decrease amount of the current of q-axis with respect to the command value does not exceed the q-axis offset value ΔIqoff, the q-axis current offset deviation ΔIq_erroff remains a negative value, and the d-axis current command value change amount ΔIdo remains increased to 0.

Figure 13:
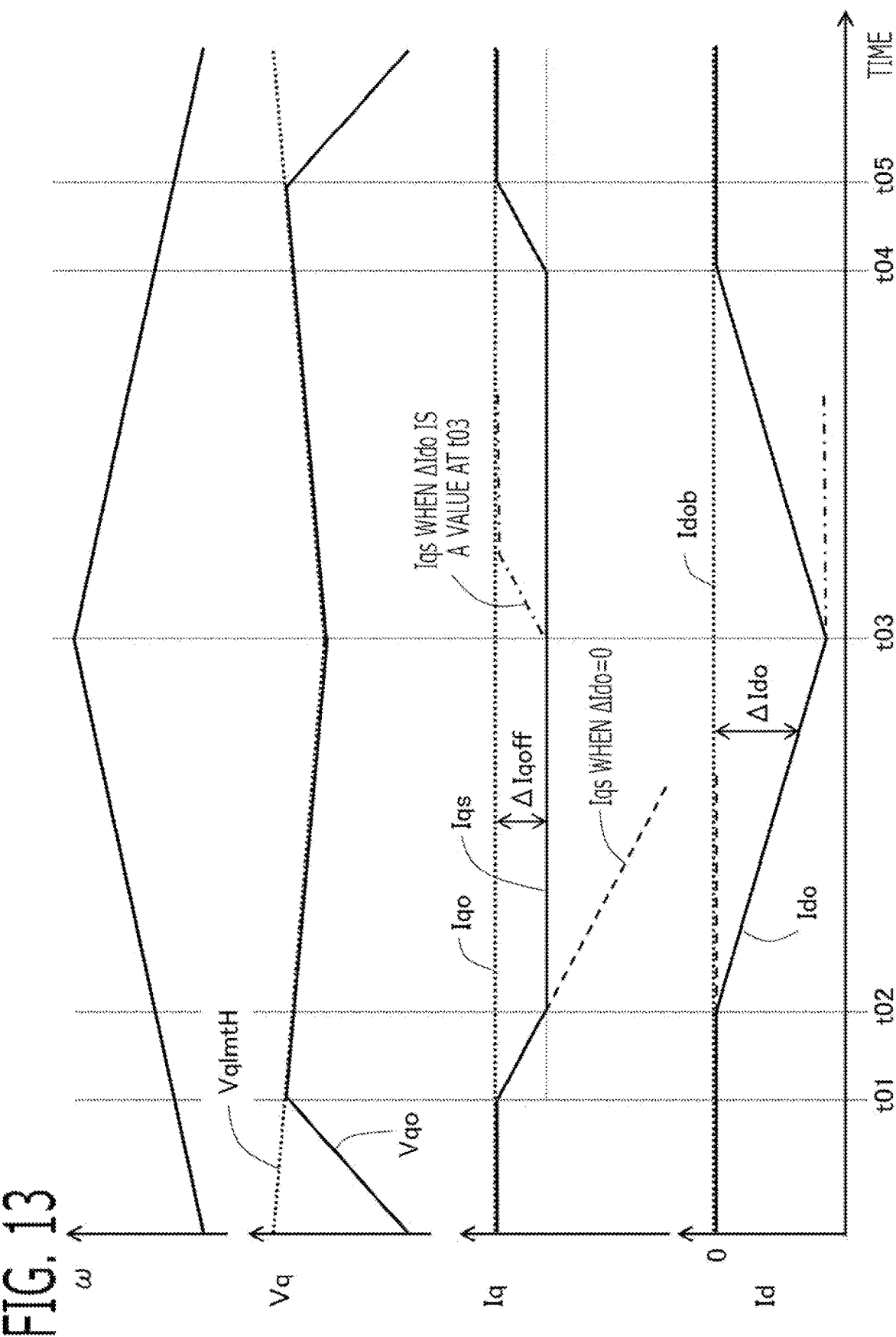
FIG. 13 is a time chart for explaining the control behavior according to Embodiment 1.

After the time t02, as shown in FIG. 13 by the broken line, if the d-axis current command value change amount ΔIdo remains 0, the decrease amount of the current of q-axis with respect to the command value exceeds the q-axis offset value ΔIqoff, the q-axis current offset deviation ΔIq_erroff becomes a positive value. Accordingly, in order to maintain the q-axis current offset deviation ΔIq_erroff at 0, the d-axis current command value change amount ΔIdo decreases gradually from 0, and the current command value of d-axis Ido decreases gradually from 0. At this time, since the current detection value of q-axis Iqs is below the current command value of q-axis Iqo by the q-axis offset value ΔIqoff, the voltage command value of q-axis Vqo is stuck to the upper limitation value VqlmtH by the voltage limit circle, and the voltage utilization factor can be maintained at the maximum value. In this way, by increasing the current command value of d-axis Ido in the negative direction, the q-axis current can be increased by the magnetic flux weakening control more than the case of ΔIdo=0 shown in FIG. 13 by the broken line, and torque can be increased. Therefore, in the case where the rotational angle speed ω increases, only by performing the feedback control which provided the q-axis offset value ΔIqoff without using the information of the inductances Ld, Lq, and the interlinkage flux ψ of the rotor, the voltage limit ellipse which is narrowed gradually can be followed automatically, the current of d-axis Id and the current of q-axis Iq are controlled at an intersection point between the voltage limit ellipse and the straight line which is decreased by the q-axis offset value ΔIqoff from the current command value of q-axis Iqo, weakening magnetic flux is performed appropriately, and torque can be increased.

After the time t03, the rotational angle speed ω decreases gradually, the induced voltage increases gradually, and the voltage limit ellipse is expanded gradually. As shown in FIG. 13 by a dashed dotted line, if the d-axis current command value change amount ΔIdo remains a value at the time t03, the decrease amount of the current of q-axis with respect to the command value is less than the q-axis offset value ΔIqoff, and the q-axis current offset deviation ΔIq_erroff becomes a negative value. Accordingly, in order to maintain the q-axis current offset deviation ΔIq_erroff at 0, the d-axis current command value change amount ΔIdo increases gradually, and the current command value of d-axis Ido increases gradually. At this time, since the current detection value of q-axis Iqs is below the current command value of q-axis Iqo by the q-axis offset value ΔIqoff, the voltage command value of q-axis Vqo is stuck to the upper limitation value VqlmtH by the voltage limit circle, and the voltage utilization factor can be maintained at the maximum value. In this way, in the case where the rotational angle speed ω decreases, only by performing the feedback control which provided the q-axis offset value ΔIqoff without using the information of the inductances Ld, Lq, and the interlinkage flux ψ of the rotor, the voltage limit ellipse which is expanded gradually can be followed automatically, the current of d-axis Id and the current of q-axis Iq are controlled at an intersection point between the voltage limit ellipse and the straight line which is decreased by the q-axis offset value ΔIqoff from the current command value of q-axis Iqo, weakening magnetic flux is performed appropriately, and torque can be increased.

At the time t04, the d-axis current command value change amount ΔIdo is increased to 0, the current command value of d-axis Ido is set to 0, and the magnetic flux weakening control is ended. Then, between the time t04 to the time t05, as the rotational angle speed ω increases, the induced voltage decreases gradually, the voltage limit ellipse is expanded gradually, and the decrease amount of the q-axis current with respect to the command value decreases gradually. Then, at the time t05, the current command values of q-axis and d-axis Iqo, Ido coincide with the voltage limit ellipse, and the voltage command value of q-axis Vqo reaches the voltage limit circle. After the time t05, the current command values of q-axis and d-axis Iqo, Ido become inside the voltage limit ellipse, the current detection value of q-axis Iqs follows the current command value of q-axis Iqo, and the voltage command value of q-axis Vqo decreases as the induced voltage decreases.

<Setting of q-Axis Offset Value ΔIqoff>

As mentioned above, since the current command value of d-axis Ido is changed preferentially so that the current detection value of q-axis Iqs is below or exceeds the current command value of q-axis Iqo by the q-axis offset value ΔIqoff, the voltage command value of q-axis Vqo can be stuck to the upper limitation value VqlmtH or the lower limitation value VqlmtL by the voltage limit circle, by the feedback control of the current of q-axis; and the voltage utilization factor can be maintained at the maximum value. On the other hand, since torque is proportional to the current of q-axis, and the current detection value of q-axis Iqs is below or exceeds the current command value of q-axis Iqo by the q-axis offset value ΔIqoff, the absolute value of torque drops by the q-axis offset value ΔIqoff. In order to reduce drop of the absolute value of torque, the q-axis offset value ΔIqoff is desired to be reduced. However, if the current detection value of q-axis Iqs exceeds or is below the current command value of q-axis Iqo by variation or noise component of the current detection value of q-axis Iqs or the current command value of q-axis Iqo, the voltage command value of q-axis Vqo cannot always be stuck to the upper limitation value VqlmtH or the lower limitation value VqlmtL by the voltage limit circle, and the voltage utilization factor cannot always be maintained at the maximum value. Accordingly, the q-axis offset value ΔIqoff is desired to be set larger than variation or noise component of the current detection value of q-axis Iqs or the current command value of q-axis Iqo.

In the case where the absolute value of the current command value of q-axis Iqo is small, if the q-axis offset value ΔIqoff is enlarged, the positive/negative of the current detection value of q-axis Iqs is different from the positive/negative of the current command value of q-axis Iqo, and the positive/negative of torque is reversed. In order to prevent this, as shown in the next equation, the d-axis current command value change unit 342 sets the q-axis offset value ΔIqoff to a value smaller than the absolute value of the current command value of q-axis Iqo.

[Equation 18]

$$\Delta I_{qoff} < |I_{qo}| \tag{18}$$

As described later using the equation (26), a response of a change amount ΔIqs of the current detection value of q-axis per a control period which is caused by a change amount ΔIds of the current detection value of d-axis per the control period becomes like the next equation. Accordingly, if the change amount ΔIqs of the current detection value of q-axis becomes smaller than the q-axis offset value ΔIqoff, the voltage command value of q-axis Vqo can always be stuck to the upper limitation value VqlmtH or the lower limitation value VqlmtL by the voltage limit circle.

[Equation 19]

$$\Delta I_{qs} = \frac{-\omega L_d}{R + L_q s} \Delta I_{ds} < \Delta I_{qoff} \tag{19}$$

Herein, the control period is a control period when the current command value of d-axis Ido is calculated. As the rotational angle speed ω, the maximum rotational angle speed ω max of the rotary electric machine may be supposed. A differential inductance term Lq×s is ignored, since it always changes according to the operating condition, and its influence on the whole equation is minute. Since a response of the current feedback control is sufficiently faster than a response of changing the current command value of d-axis, the change amount ΔIds of the current detection value of d-axis can be replaced to the change amount ΔIdodT of the current command value of d-axis per the control period. From these, the equation (19) can be changed into the next equation.

[Equation 20]

$$\frac{-\omega_{max} L_d}{R} \Delta I_{do\,dT} < \Delta I_{qoff} \tag{20}$$

The change amount $\Delta I_{dodT}$ of the current command value of d-axis per the control period can be grasped previously. Accordingly, the d-axis current command value change unit 342 may set the q-axis offset value $\Delta I_{qoff}$ so as to satisfy the equation (20).

And, as shown in the next equation, it is desirable to set the q-axis offset value $\Delta I_{qoff}$ to a value larger than an amplitude of noise component $\Delta I_{qns}$ superimposed on the current detection value of q-axis Iqs. Even if the noise component is superimposed on the current of q-axis, the voltage command value of q-axis Vqo can always be stuck to the upper limitation value VqlmtH or the lower limitation value VqlmtL by the voltage limit circle.

[Equation 21]

$$\Delta I_{qns} < \Delta I_{qoff} \tag{21}$$

By the noise component of the current detection value of q-axis Iqs, the q-axis current offset deviation $\Delta Iq\_erroff$ is varied, and the current command value of d-axis Ido is also varied. Especially, variation of the term of proportional control becomes large, and it is necessary to consider an amplification by the proportional gain Kpid. By variation of the current command value of d-axis Ido, the current command value of q-axis Iqo is varied proportionally via the current limit circle.

Accordingly, as shown in the next equation, it is desirable to set the q-axis offset value $\Delta I_{qoff}$ to a value larger than a value obtained by multiplying the proportional gain Kpid for d-axis current command value calculation, to the amplitude of noise component $\Delta I_{qns}$ which superimposed on the current detection value of q-axis Iqs.

[Equation 22]

$$K_{pid}\Delta I_{qns} < \Delta I_{qoff} \tag{22}$$

In order to reduce influence of noise of the current of q-axis, a low pass filter processing which reduces the noise component may be performed to the current detection value of q-axis Iqs used for calculation of the q-axis current offset deviation $\Delta Iq\_erroff$. A cutoff frequency of the low pass filter processing may be set so that a response of calculation processing of the current command value of d-axis Ido is not deteriorated.

From the above, for example, the d-axis current command value change unit 342 may upper-limit the q-axis offset value $\Delta I_{qoff}$ which is set so as to satisfy any one or more of the equation (20), the equation (21), and the equations (22), by the absolute value of the current command value of q-axis Iqo like the equation (19).

<Setting of Proportional Gain Kpid for d-Axis Current Command Value Calculation>

Although the proportional gain Kpid of the equation (13) and the equation (15) may be set to a positive value, an appropriate setting method considering response will be explained in the following. The d-axis current command value change unit 342 changes the proportional gain Kpid for d-axis current command value calculation in inverse proportion to the rotational angle speed ω. In the present embodiment, as shown in the next equation, a value obtained by dividing a target response angular frequency ωido by the rotational angle speed ω is set to the proportional gain Kpid. The target response angular frequency ωido is a target response angular frequency of the feedback control system which changes the current command value of d-axis Ido according to the q-axis current offset deviation $\Delta Iq\_erroff$, and decreases an absolute value of the q-axis current offset deviation $\Delta Iq\_erroff$.

[Equation 23]

$$K_{pid} = \frac{\omega_{ido}}{\omega} \tag{23}$$

The target response angular frequency ωido may be set to a value larger than R/Lq. By setting in this way, a time (time constant) required for convergence of the q-axis current offset deviation $\Delta Iq\_erroff$ becomes shorter than the time constant Lq/R of circuit. Accordingly, in the region of the magnetic flux weakening control, in response to the change of the rotational angle speed and required torque, the current command values of d-axis and q-axis Ido, Iqo are changed comparatively fast, and the output torque can be changed. Like the present embodiment, in the case where the rotary electric machine is used as the driving force source for assistance of the electric power steering apparatus 100, for example, if the target response angular frequency ωido is set to a value between 250 [rad/s] and 1200 [rad/s], a good steering feeling may be obtained.

The integral time Tiid of the equation (13) and the equation (15) may be set to the time constant Lq/R of circuit for example. An integral gain becomes Kpid/Tiid. Accordingly, from the equation (23), the integral gain is also changed in inverse proportion to the rotational angle speed ω. For example, the integral gain is set to a value obtained by dividing a value obtained by multiplying the resistance value R of winding to the target response angular frequency ωido, by the rotational angle speed ω and the inductance Lq.

If the equation of the voltage of q-axis Vq is extracted from the voltage equation of the equation (7), and Vq is replaced to Vqo, and Id and Iq are replaced to Ids and Iqs, the next equation is obtained.

[Equation 24]

$$V_{qo} = (R+sL_q)I_{qs} + \omega L_d I_{ds} + \omega \varphi \tag{24}$$

The next equation is obtained by solving the equation (24) for the current detection value of q-axis Iqs.

[Equation 25]

$$I_{qs} = \frac{V_{qo} - \omega L_d I_{ds} - \omega \varphi}{R + sL_q} \tag{25}$$

At execution of the magnetic flux weakening control, the voltage command value of q-axis Vqo coincides with the upper limitation value VqlmtH or the lower limitation value VqlmtL by the voltage limit circle. Accordingly, a control of the current detection value of q-axis Iqs by operation of the voltage command value of q-axis Vqo is not considered, but a control of the current detection value of q-axis Iqs by operation of the current detection value of d-axis Ids is considered. Therefore, if the terms of Vqo and ωψ of the equation (25) are ignored, the equation (25) becomes like the next equation.

[Equation 26]

$$I_{qs} = \frac{-\omega L_d}{R + sL_q} I_{ds} \tag{26}$$

From the equation (26), a transfer function Gp(s) from the current detection value of d-axis Ids to the current detection value of q-axis Iqs becomes like the next equation.

[Equation 27]

$$G_p(s) = \frac{I_{qs}}{I_{ds}} = \frac{-\omega L_d}{R + sL_q} \quad (27)$$

Accordingly, it is found that the change amount of the current detection value of q-axis Iqs by operation of the current detection value of d-axis Ids increases in proportion to the rotational angle speed ω.

Figure 14:
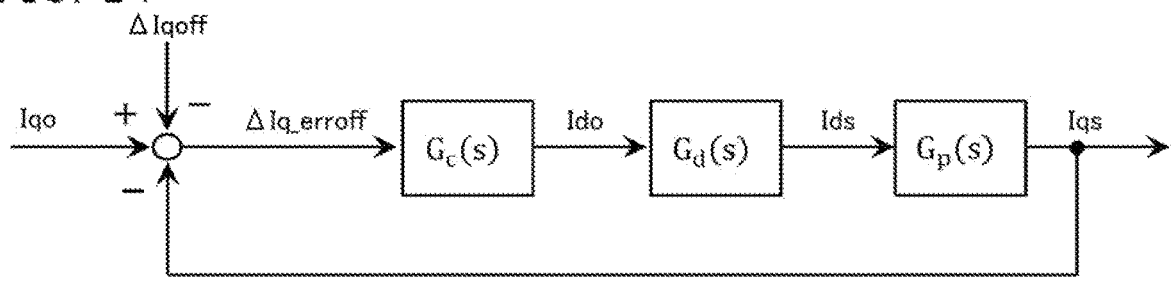
FIG. 14 is a block diagram for explaining setting of the proportional gain according to Embodiment 1.

If this transfer function Gp (s) is used, the control system can be expressed as shown in the block diagram of FIG. 14. A transfer function Gc(s) from the q-axis current offset deviation ΔIq_erroff to the current command value of d-axis Ido becomes like the next equation from the equation (13) and the equation (23). Herein, the integral time Tiid is set to Lq/R.

[Equation 28]

$$G_c(s) = \frac{I_{do}}{\Delta I_{q\_erroff}} = -K_{pid}\left(1 + \frac{1}{T_{iid}s}\right) \quad (28)$$

$$= -\frac{\omega_{ido}}{\omega}\left(1 + \frac{R}{L_q s}\right) = -\omega_{ido}\frac{R + L_q s}{\omega L_q s}$$

A transfer function Gd(s) from the current command value of d-axis Ido to the current detection value of d-axis Ids can be expressed by the next equation. Herein, ωids is a target response angular frequency of a current feedback control of d-axis.

[Equation 29]

$$G_d(s) = \frac{\omega_{ids}}{\omega_{ids} + s} \quad (29)$$

The target response angular frequency ωids of the current feedback control of d-axis is preferably set sufficiently higher than the target response angular frequency ωido of the current command value of d-axis. ωids becomes Kd/Ld using the proportional gain Kd of d-axis of the equation (2). Accordingly, the proportional gain Kd of d-axis may be set to a value larger than ωido×Ld. For example, preferably, the proportional gain Kd of d-axis may be set to a value larger than 3×ωido×Ld. More preferably, the proportional gain Kd of d-axis may be set to a value larger than 5×ωido×Ld. By setting the proportional gain Kd of d-axis in this way, it can be supposed that Gd(s)≈1.

[Equation 30]

$$\omega_{ids} \gg \omega_{ido}, \omega_{ids} = \frac{K_d}{L_d} \quad (30)$$

$$K_d > \omega_{ido} L_d$$

$$K_d > 3\omega_{ido} L_d$$

$$K_d > 5\omega_{ido} L_d$$

From the above, a transfer function Gop(s) of open loop from the q-axis current offset deviation ΔIq_erroff to the current detection value of q-axis Iqs can be expressed by the next equation. Herein, by assuming that the d-axis inductance Ld and the q-axis inductance Lq are almost equal, and Gd (s)≈1, the equation is arranged.

[Equation 31]

$$G_{op}(s) = G_c(s)G_d(s)G_p(s) \quad (31)$$

$$= -\omega_{ido}\frac{R + L_q s}{\omega L_q s} \cdot \frac{\omega_{ids}}{\omega_{ids} + s} \cdot \frac{-\omega L_d}{R + sL_q} \approx \frac{\omega_{ido}}{s}$$

Figure 15:
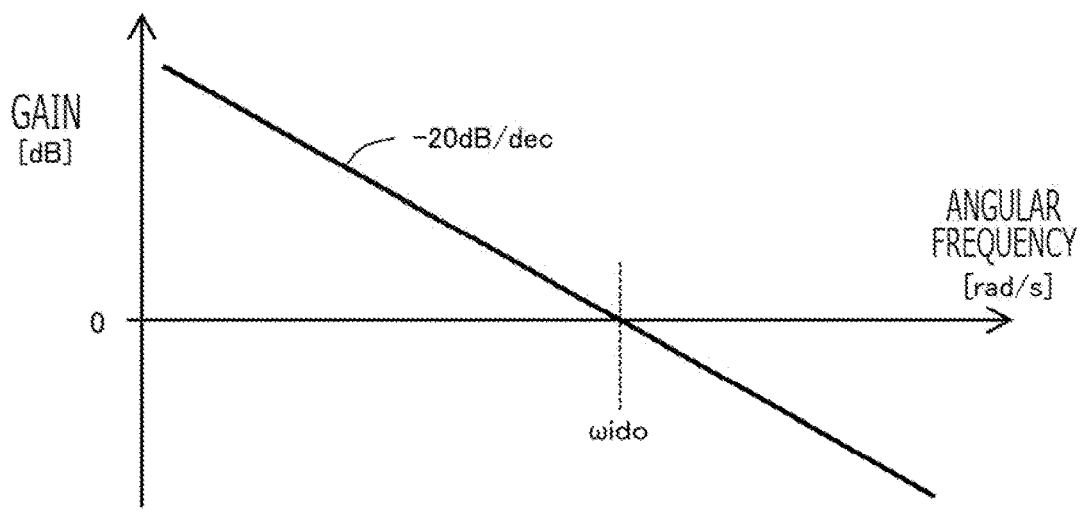
FIG. 15 is a Bode diagram of the transfer function of open loop from the q-axis current offset deviation to the current detection value of q-axis according to Embodiment 1.

The equation (31) is a simple integration characteristic and does not depend on the rotational angle speed ω. Bode diagram becomes as shown in FIG. 15, an inclination of gain is a constant value of −20 dB/dec, and at angular frequency=ωido, it becomes 0 dB.

Accordingly, as shown in the next equation, a transfer function Gfb(s) of closed loop of a change of the current detection value of q-axis Iqs with respect to a change of the base current command value of q-axis Iqob becomes a first order lag which has a time constant of a reciprocal of the target response angular frequency ωido. Accordingly, in the magnetic flux weakening control, by changing the proportional gain Kpid for d-axis current command value calculation in inverse proportion to the rotational angle speed ω as shown in the equation (23), a response of the change of the current detection value of q-axis Iqs with respect to the change of the base current command value of q-axis Iqob can be made to be the first order lag which has the time constant of the reciprocal of the target response angular frequency ωido and is not varied according to the rotational angle speed ω. Accordingly, a desired torque response can be obtained by the setting of the target response angular frequency ωido. Thereby, the steering feeling of the electric power steering apparatus 100 can be improved.

[Equation 32]

$$G_{fb}(s) = \frac{G_{op}(s)}{1 + G_{op}(s)} \approx \frac{1}{\frac{1}{\omega_{ido}}s + 1} \quad (32)$$

Different from the equation (23), a case where the proportional gain Kpid for d-axis current command value calculation is set to a fixed value, without changing according to the rotational angle speed ω will be explained. In this case, in the equation (31), the term of ω which exists in Gp (s) is no longer canceled by the term of 1/ω which exists in Gc (s) via the proportional gain Kpid. Accordingly, as shown in the next equation, the transfer function Gop(s) of open loop becomes a characteristic which is proportional to ω.

[Equation 33]

$$G_{op}(s) \approx \frac{K\omega\omega_{ido}}{s} \quad (33)$$

Figure 16:
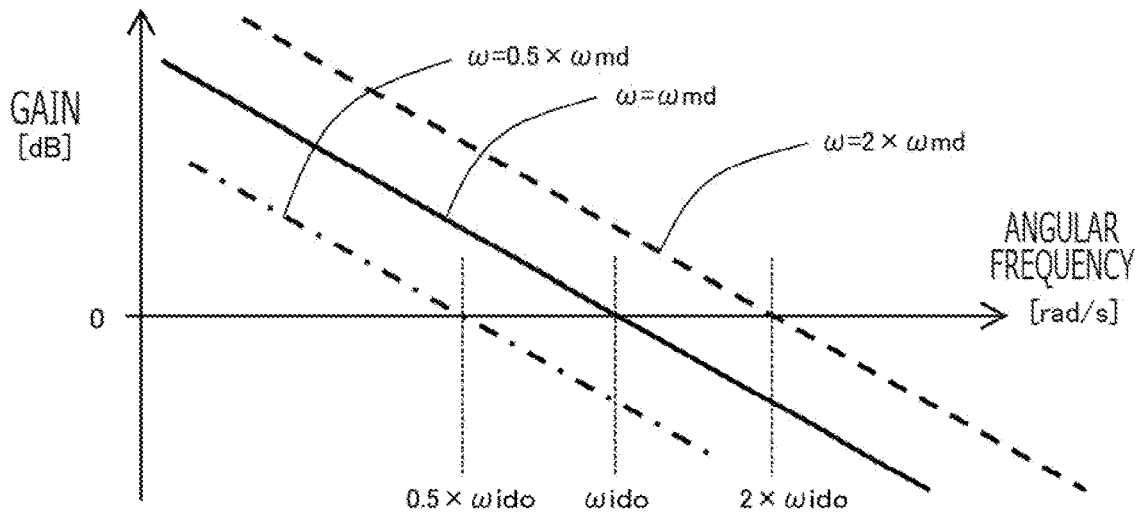
FIG. 16 is a Bode diagram of the transfer function of open loop from the q-axis current offset deviation to the current detection value of q-axis according to a comparative example.

Herein, K is a constant. At ω=ωmd, in order to obtain the same characteristic as the equation (31), it is set that K=1/ωmd. As FIG. 16 shows Bode diagram when ω=0.5×ωmd, ω=1×ωmd, and ω=2×ωmd, a response is varied by ω/ωmd times, when the rotational angle speed ω is varied from ωmd. When ω=1×ωmd, since the response of the transfer function Gop(s) of open loop becomes ωido, a desired response is obtained. However, when ω=2×ωmd, the response of Gop(s) becomes double, and there is an advantage that the response becomes better. However, a feedback amount of the noise component included in the current detection value of q-axis Iqs becomes double, and the strange noise of the rotary electric machine may increase. On the other hand, when ω=0.5×ωmd, the response of Gop(s) becomes 0.5 times, the response of the current of q-axis is deteriorated, and the response of torque is deteriorated. Accordingly, the response of torque is varied according to the rotational angle speed ω, the steering feeling of the electric power steering apparatus 100 may be deteriorated.

2. Embodiment 2

The controller 10 according to Embodiment 2 will be explained. The explanation for constituent parts the same as those in Embodiment 1 will be omitted. The basic configuration of the rotary electric machine 1, the electric power converter 4, and the controller 10 according to the present embodiment is the same as that of Embodiment 1. Embodiment 2 is different from Embodiment 1 in the setting method of the q-axis offset value ΔIqoff.

As shown in FIG. 13 of Embodiment 1, when the rotational angle speed ω is increasing from the time t02 to the time t03, as shown by a dashed line, the current detection value of q-axis Ids if the d-axis current command value change amount ΔIdo remains 0 drops without limitation, and the q-axis current offset deviation ΔIq_erroff increases without limitation. Accordingly, the response of the d-axis current command value change amount ΔIdo calculated based on the q-axis current offset deviation ΔIq_erroff becomes a response according to a setting value of the proportional gain Kpid, irrespective of increase amount of the rotational angle speed ω. And, there is no problem in particular.

On the other hand, when the rotational angle speed ω is decreasing from the time t03 to the time t04, as shown by a dashed dotted line, the current detection value of q-axis Ids if the d-axis current command value change amount ΔIdo remains a value at the time t03 increases only to the current command value of q-axis Iqo, and an absolute value of the q-axis current offset deviation ΔIq_erroff is upper-limited by the q-axis offset value ΔIqoff. Accordingly, since the absolute value of the q-axis current offset deviation ΔIq_erroff is upper-limited by the q-axis offset value ΔIqoff when the decrease amount of the rotational angle speed ω is large, the response of the d-axis current command value change amount ΔIdo calculated based on the q-axis current offset deviation ΔIq_erroff drops lower than the response according to the setting value of the proportional gain Kpid. And, the response frequency of the d-axis current command value change amount ΔIdo with respect to the change of the current detection value of q-axis Iqs is lower than the response frequency of the voltage command value of q-axis Vqo with respect to the change of the current detection value of q-axis Iqs. Accordingly, an increase in the d-axis current command value change amount ΔIdo is delayed with respect to a decrease in the induced voltage and an increase in the current detection value of q-axis Iqs due to a decrease of the rotational angle speed ω, and the current detection value of q-axis Iqs increases easily. On the other hand, if the response frequency of the d-axis current command value change amount ΔIdo is raised too much, stability of the control system is deteriorated and there is a limit. That is, in the case where the rotational angle speed ω is decreasing, if the q-axis offset value ΔIqoff is set to a small value too much, the response of the d-axis current command value change amount ΔIdo is deteriorated, when a decrease amount of the rotational angle speed ω is large. If the response of the d-axis current command value change amount ΔIdo drops, the response of the current of q-axis will be deteriorated, and the response of torque is deteriorated.

Then, in the present embodiment, when the rotational angle speed ω is decreasing, the d-axis current command value change unit 342 sets the q-axis offset value ΔIqoff to a value larger than when the rotational angle speed ω is increasing.

According to this configuration, when the rotational angle speed ω is decreasing, the q-axis offset value ΔIqoff which becomes an upper limitation value of the absolute value of the q-axis current offset deviation ΔIq_erroff is increased. When the decrease amount of the rotational angle speed ω is large, the response of d-axis current command value change amount ΔIdo can be prevented from being deteriorated, and the response of the current of q-axis and the response of torque can be prevented from being deteriorated.

In the present embodiment, by referring to an offset value setting data in which a relation between the change amount of the rotational angle speed Δω per unit time and the q-axis offset value ΔIqoff is preliminarily set, the d-axis current command value change unit 342 calculates the q-axis offset value ΔIqoff corresponding to the present change amount of the rotational angle speed Δω. As shown in the next equation, the d-axis current command value change unit 342 calculates the change amount of the rotational angle speed Δω per unit time by subtracting the rotational angle speed ω (t-Δt) before unit time Δt from the present rotational angle speed ω (t). For example, the unit time Δt is set to a natural number times of the calculation period of the rotational angle speed ω. The change amount of the rotational angle speed Δω per unit time corresponds to the rotational angle acceleration.

[Equation 34]

$$\Delta\omega = \omega(t) - \omega(t-\Delta t) \tag{34}$$

Figure 17:
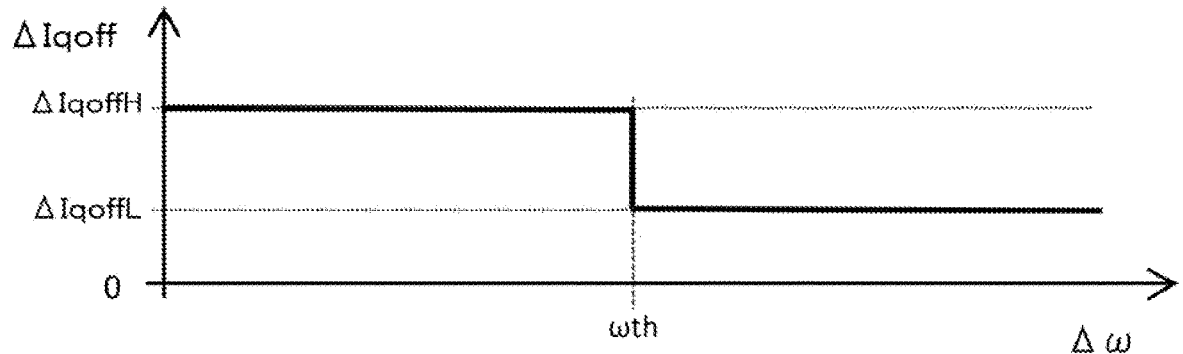
FIG. 17 is a figure for explaining the offset value setting data for setting the q-axis offset value according to Embodiment 2.

The offset value setting data is set, for example, as shown in FIG. 17. In the example shown in FIG. 17, when the change amount of the rotational angle speed Δω is larger than a threshold value ωth, the q-axis offset value ΔIqoff is set to a low setting value ΔIqoffL. When the change amount of the rotational angle speed Δω is smaller than the threshold value ωth, the q-axis offset value ΔIqoff is set to a high setting value ΔIqoffH which is larger than the low setting value ΔIqoffL. The threshold value ωth is set to 0 or a negative value. Since the high setting value ΔIqoffH and the low setting value ΔIqoffL are set to constant values, even if the change amount of the rotational angle speed Δω increases or decreases on the higher side or the lower side of the threshold value ωth, the current of q-axis can be prevented from being varied, and the torque can be prevented from being varied.

Since the rotational angle speed ω is calculated by differential operation of the rotational angle θ, it is varied easily. Accordingly, even though speed is constant, the change amount of the rotational angle speed Δω is easily varied in the vicinity of 0. If the threshold value ωth is set to a negative value, even if the change amount of the rotational angle speed Δω is varied in the vicinity of 0, the q-axis offset value ΔIqoff can maintain set to the low setting value ΔIqoffL, and the currents of d-axis and q-axis can be prevented from being varied. The rotational angle speed ω to which a low pass filter processing was performed may be used.

3. Embodiment 3

Figure 18:
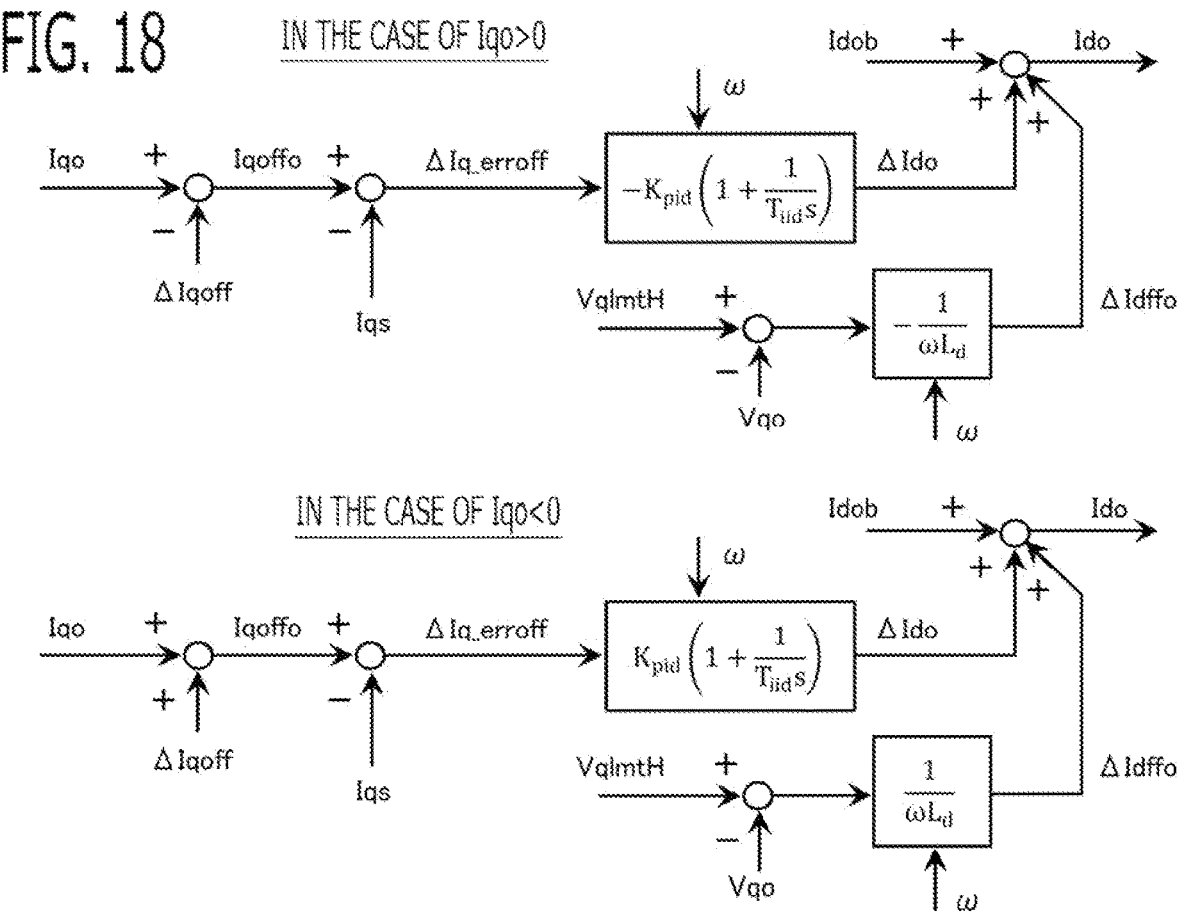
FIG. 18 is a block diagram of the d-axis current command value change unit according to Embodiment 3.

The controller 10 according to Embodiment 3 will be explained. The explanation for constituent parts the same as those in Embodiment 1 will be omitted. The basic configuration of the rotary electric machine 1, the electric power converter 4, and the controller 10 according to the present embodiment is the same as that of Embodiment 1. The configuration of the d-axis current command value change unit 342 is partially different from Embodiment 1. FIG. 18 shows the block diagram of the d-axis current command value change unit 342 according to the present embodiment.

First, a concept of control design will be explained. The equation of the voltage of q-axis Vq is extracted from the voltage equation of the equation (7), and the present state is shown in the next equation.

[Equation 35]

$$V_{qo} = (R + sL_q)I_{qo} + \omega L_d I_{do} + \omega \alpha \quad (35)$$

In the execution state of the magnetic flux weakening control, in the case where the current command value of q-axis Iqo is a positive value, the voltage command value of q-axis Vqo is upper-limited by the upper limitation value VqlmtH by the voltage limit circle. And, a state where the current of d-axis is manipulated by ΔId and the voltage command value of q-axis Vqo reached the upper limitation value VqlmtH by the voltage limit circle is shown in the next equation.

[Equation 36]

$$V_{qlmtH} = (R + sL_q)I_{qo} + \omega L_d (I_{do} + \Delta I_d) + \omega \varphi \quad (36)$$

If the equation (36) is deformed after subtracting the equation (35) from the equation (36), an operating amount of d-axis current ΔIdffo for setting a deviation between Vq and VqlmtH to 0 becomes the next equation. In the case where the current command value of q-axis Iqo is a negative value, the operating amount of d-axis current ΔIdffo is similarly derived using the lower limitation value VqlmtL.

[Equation 37]

1) IN CASE OF $I_{qo} > 0$ (37)

$$\Delta I_{dffo} = -\frac{1}{\omega L_d}(V_{qlmtH} - V_{qo})$$

2) IN CASE OF $I_{qo} < 0$ $$\Delta I_{dffo} = \frac{1}{\omega L_d}(V_{qlmtL} - V_{qo})$$

Accordingly, in order to coincide the voltage command value of q-axis Vqo with the upper limitation value VqlmtH or the lower limitation value VqlmtL of the q-axis voltage command value, the current command value of d-axis Ido may be corrected by a feedforward correction amount ΔIdffo calculated by the equation (37). A proportional gain which is multiplied to the deviation is changed in inverse proportion to the rotational angle speed ω. Accordingly, in the present embodiment, the d-axis current command value change unit 342 corrects the current command value of d-axis Ido, based on the deviation between the voltage command value of q-axis Vqo, and the upper limitation value VqlmtH or the lower limitation value VqlmtL of the voltage command value of q-axis. This correction is executed in the execution region of the magnetic flux weakening control. A low pass filter processing for reducing a noise component to the feedforward correction amount ΔIdffo may be performed.

In order to change the voltage command value of q-axis Vqo to the upper limitation value VqlmtH or the lower limitation value VqlmtL, the current command value of d-axis Ido can be changed in feedforward, and the response can be improved.

As shown in the next equation, the d-axis current command value change unit 342 calculates the current command value of d-axis Ido by adding the d-axis current command value change amount ΔIdo and the feedforward correction amount ΔIdffo to the base current command value of d-axis Idob.

[Equation 38]

$$I_{do} = I_{dob} + \Delta I_{do} + \Delta I_{dffo} \quad (38)$$

Similarly to Embodiment 1, the d-axis current command value limitation unit 343 upper-limits and lower-limits the current command value of d-axis Ido calculated by the equation (38), by the upper limitation value IdlmtH and the lower limitation value IdlmtL.

4. Embodiment 4

The controller 10 according to Embodiment 4 will be explained. The explanation for constituent parts the same as those in Embodiment 1 will be omitted. The basic configuration of the rotary electric machine 1, the electric power converter 4, and the controller 10 according to the present embodiment is the same as that of Embodiment 1. Embodiment 4 is different from Embodiment 1 in that the current command value calculation unit 34 is provided with a q-axis current command value change unit 345. FIG. 19 shows the block diagram of the current command value calculation unit 34 according to the present embodiment, and FIG. 20 shows the block diagram of the q-axis current command value change unit 345.

The q-axis current command value change unit 345 calculates a q-axis current command correction value ΔIqo, based on a q-axis current deviation obtained by subtracting the current detection value of q-axis Iqs from the current command value of q-axis Iqo; and calculates the current command value of q-axis Iqo by adding the q-axis current command correction value ΔIqo to the current command value of q-axis Iqobf before correction. Although the final current command value of q-axis Iqo after correction used for the current feedback control is used for the current command value of q-axis Iqo for calculating the q-axis current deviation, the value calculated at the last time calculation period is used. The current command value of q-axis Iqo after limitation by the current limit circle shown in the equation (17) is used for the current command value of q-axis Iqobf before correction.

Since the current detection value of q-axis Iqs is decreased or increased from the current command value of q-axis Iqo by the q-axis offset value ΔIqoff, the absolute value of output torque drops by a torque amount corresponding to the q-axis offset value ΔIqoff. Then, as described above, since the current command value of q-axis Iqo is increased or decreased by an amount that the current detection value of q-axis Iqs is decreased or increased from the current command value of q-axis Iqo, the absolute value of output torque can be prevented from dropping. Since the q-axis current command correction value ΔIqo is calculated based on the q-axis current deviation, a state where the q-axis current is limited to the voltage limit ellipse can be detected automatically, without performing condition determination, and the correction can be performed.

The q-axis current command value change unit 345 calculates a value obtained by performing a low pass filter processing to the q-axis current deviation, as the q-axis current command correction value ΔIqo. For example, a first-order-lag filter processing is used as the low pass filter processing. Other processing, such as a moving average processing, may be used as the low pass filter processing. Since the current detection value of q-axis Iqs is a vibration element, instead of performing the low pass filter processing to the q-axis current deviation, the q-axis current deviation may be calculated using the current detection value of q-axis Iqs to which a low pass filter processing is performed.

[Equation 39]

$$\Delta I_{qo} = \frac{1}{T_f s + 1}(I_{qo} - I_{qs}) \quad (39)$$

$$I_{qo} = I_{qobf} + \Delta I_{qo}$$

Other Embodiments

The rotary electric machine 1 may be a driving force source of various kinds of apparatuses other than the electric power steering apparatus 100. For example, the rotary electric machine 1 may be a driving force source of wheels.

The stator may be provided with windings of plural phases other than three phases (for example, two phases, four phases).

The stator is provided with plural pairs (for example, two pairs) of three-phase windings, and each part of the electric power converter and the controller may be provided corresponding to the three-phase windings of each pair.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1: Rotary Electric Machine, 4: Electric Power Converter, 10: Controller for Rotary Electric Machine, 31: Rotation Detection Unit, 32: Current Detection Unit, 33: Current Coordinate Conversion Unit, 34: Current Command Value Calculation Unit, 35: Voltage Command Value Calculation Unit, 36: Switching Control Unit, 100: Electric Power Steering Apparatus, 101: Driving Force Transmission Mechanism, Ido: Current Command Value of d-axis, Idob: Base Current Command Value of d-axis, Ids: Current Detection Value of d-axis, Imax: Maximum Current Value, Iqo: Current Command Value of q-axis, Iqob: Base Current Command Value of q-axis, Iqoffo: Offset q-axis Current Command Value, Iqs: Current Detection Value of q-axis, Vdc: DC Voltage, Vdo: Voltage Command Value of d-axis, Vqo: Voltage Command Value of q-axis, ΔIdo: d-axis Current Command Value Change Amount, ωido: Target Response Angular Frequency

What is claimed is:

1. A controller for rotary electric machine that controls a rotary electric machine which is provided with a stator having plural-phase windings and a rotor having a magnet via an electric power converter, the controller for rotary electric machine comprising at least one processor configured to implement:

a current detector that detects currents which flows into the plural-phase windings;

a current coordinate convertor that converts current detection values into a current detection value of d-axis and a current detection value of q-axis on a dq-axis rotating coordinate system consisting of a d-axis defined in a direction of a magnetic pole position of the rotor and a q-axis defined in a direction advanced to the d-axis by 90 degrees in an electrical angle, based on a rotational angle of the rotor;

a current command value calculator that calculates a current command value of d-axis and a current command value of q-axis;

a voltage command value calculator that changes a voltage command value of d-axis and a voltage command value of q-axis so that the current detection value of d-axis approaches the current command value of d-axis, and the current detection value of q-axis approaches the current command value of q-axis; and converts the voltage command value of d-axis and the voltage command value of q-axis into voltage command values of plural-phase, based on the rotational angle; and a switching controller that turns on and off a plurality of switching devices provided in the electric power converter, based on the voltage command values of plural-phase, wherein, in a case where the current command value of q-axis is a positive value, the current command value calculator changes the current command value of d-axis, based on a deviation between an offset q-axis current command value obtained by subtracting a q-axis offset value which is a positive value, from the current command value of q-axis, and the current detection value of q-axis.

2. The controller for rotary electric machine according to claim 1, wherein, in the case where the current command value of q-axis is the positive value, the current command value calculator decreases the current command value of d-axis, when the current detection value of q-axis is less than the offset q-axis current command value, and the current command value calculator increases the current command value of d-axis, when the current detection value of q-axis exceeds the offset q-axis current command value.

3. The controller for rotary electric machine according to claim 1, wherein the current command value calculator limits the current command value of q-axis so that a current supplied to the plural-phase windings does not exceed a range of a maximum current value which can be supplied to the plural-phase windings, based on the maximum current value and the current command value of d-axis.

4. The controller for rotary electric machine according to claim 1,
wherein the voltage command value calculator limits the voltage command value of q-axis so that the voltage command values applied to the winding does not exceed a range of a maximum applied voltage according to a DC voltage supplied to the electric power converter, based on the DC voltage and the voltage command value of d-axis.

5. The controller for rotary electric machine according to claim 4,
wherein the voltage command value calculator performs a low pass filter processing to the voltage command value of d-axis used for limitation processing of the voltage command value of q-axis.

6. The controller for rotary electric machine according to claim 1,
wherein, in a case where the current command value of q-axis is a negative value,
the current command value calculator changes the current command value of d-axis, based on a deviation between the offset q-axis current command value obtained by adding the q-axis offset value which is the positive value, to the current command value of q-axis, and the current detection value of q-axis.

7. The controller for rotary electric machine according to claim 6,
wherein, in the case where the current command value of q-axis is the negative value,
the current command value calculator decreases the current command value of d-axis, when the current detection value of q-axis exceeds the offset q-axis current command value, and
the current command value calculator increases the current command value of d-axis, when the current detection value of q-axis is less than the offset q-axis current command value.

8. The controller for rotary electric machine according to claim 1,
wherein the current command value calculator sets the q-axis offset value to a value smaller than an absolute value of the current command value of q-axis.

9. The controller for rotary electric machine according to claim 1,
wherein, when a rotational angle speed of the rotor is decreasing, the current command value calculator sets the q-axis offset value to a value larger than when the rotational angle speed of the rotor is increasing.

10. The controller for rotary electric machine according to claim 1,
wherein, if defining a maximum rotational angle speed in the electrical angle of the rotary electric machine as $\omega$ max, defining an inductance of the rotary electric machine as L, defining a winding resistor as R, defining a change amount of the current detection value of d-axis per a control period as $\Delta$IdodT, and defining the q-axis offset value as $\Delta$Iqoff, the current command value calculation unit calculator sets the q-axis offset value so as to satisfy "$\Delta$Iqoff>$\omega$ max×L/R×$\Delta$IdodT".

11. The controller for rotary electric machine according to claim 1,
wherein the current command value calculator sets the q-axis offset value to a value larger than an amplitude of noise component superimposed on the current detection value of q-axis.

12. The controller for rotary electric machine according to claim 1,
wherein the current command value calculator calculates the current command value of d-axis by multiplying a proportional gain to a deviation between the offset q-axis current command value and the current detection value of q-axis; and
sets the q-axis offset value to a value larger than a value obtained by multiplying a proportional gain to an amplitude of noise component superimposed on the current detection value of q-axis.

13. The controller for rotary electric machine according to claim 1,
wherein the current command value calculator performs a low pass filter processing to the current detection value of q-axis used for calculation of the current command value of d-axis.

14. The controller for rotary electric machine according to claim 1,
wherein the current command value calculator corrects the current command value of d-axis, based on a deviation between the voltage command value of q-axis and a limit value of the voltage command value of q-axis.

15. The controller for rotary electric machine according to claim 1,
wherein the current command value calculator calculates a correction value, based on a deviation obtained by subtracting the current detection value of q-axis from the current command value of q-axis; and
calculates the current command value of q-axis by adding the correction value to the current command value of q-axis before correction.

16. The controller for rotary electric machine according to claim 1,
wherein the current command value calculator calculates a correction value, based on a deviation obtained by subtracting the current detection value of q-axis from the current command value of q-axis; and
calculates the current command value of q-axis by adding the correction value to the current command value of q-axis before correction.

17. An electric power steering apparatus comprising:
the controller for rotary electric machine according to claim 1,
the electric power converter,
the rotary electric machine, and
a driving force transmission mechanism which transmits a driving force of the rotary electric machine to a vehicle steering apparatus.

* * * * *